US012482432B2

(12) United States Patent
Kim

(10) Patent No.: US 12,482,432 B2
(45) Date of Patent: Nov. 25, 2025

(54) DISPLAY DEVICE INCLUDING SENSOR

(71) Applicant: SAMSUNG DISPLAY CO., LTD., Yongin-si (KR)

(72) Inventor: Hyomin Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/616,720

(22) Filed: Mar. 26, 2024

(65) Prior Publication Data

US 2024/0420648 A1 Dec. 19, 2024

(30) Foreign Application Priority Data

Jun. 16, 2023 (KR) ........................ 10-2023-0077660

(51) Int. Cl.
*G09G 3/3291* (2016.01)

(52) U.S. Cl.
CPC .................................. *G09G 3/3291* (2013.01)

(58) Field of Classification Search
CPC ........................................................ G09G 3/32
USPC ...................................................... 345/76–89
See application file for complete search history.

(56) References Cited

U.S. PATENT DOCUMENTS 11,694,612 B2 7/2023 Lee et al.
2017/0262095 A1* 9/2017 Reynolds ............ G06F 3/04166
2019/0347994 A1* 11/2019 Lin .......................... G09G 3/32
2020/0033979 A1* 1/2020 Sauer ...................... G06F 3/044
2021/0027696 A1* 1/2021 Kim ..................... G09G 3/3233
2022/0067340 A1* 3/2022 Han ................... G06V 40/1365
2022/0285460 A1 9/2022 Kim et al.
2022/0344416 A1* 10/2022 Park ....................... H10K 39/32
2023/0089207 A1* 3/2023 Lee .................... G06V 40/1318 345/211
2023/0094533 A1* 3/2023 Krah .................... H10H 20/857 345/174
2023/0112708 A1* 4/2023 Toyotaka ............ G06F 3/03545 345/89

FOREIGN PATENT DOCUMENTS

CN 112768493 5/2021
KR 10-0573134 4/2006
KR 10-2022-0125839 9/2022
KR 10-2022-0146212 11/2022
KR 10-2023-0041905 3/2023

* cited by examiner

*Primary Examiner* — Kwin Xie

(74) *Attorney, Agent, or Firm* — F. CHAU & ASSOCIATES, LLC

(57) ABSTRACT

A display device which includes a pixel that includes a light emitting element, a first sensor that includes a first light sensing element connected to a first sensing node, a second sensor that includes a second light sensing element connected to a second sensing node, and a first connection transistor that electrically connects the first sensing node of the first sensor and the second sensing node of the second sensor in response to a switching signal.

15 Claims, 10 Drawing Sheets

DISPLAY DEVICE INCLUDING SENSOR

CROSS-REFERENCE TO RELATED APPLICATIONS

This patent application claims priority under 35 U.S.C. § 119 to Korean Patent Application No. 10-2023-0077660 filed on Jun. 16, 2023, in the Korean Intellectual Property Office, the disclosure of which is incorporated by reference in its entirety herein.

TECHNICAL FIELD

Embodiments of the present disclosure described herein are directed to a display device including a sensor.

Discussion of Related Art

An electronic device such as a television (TV), a mobile phone, a tablet computer, a navigation system, or a game console includes a display device for displaying an image. In addition to a general input device such as a button, a keyboard, or a mouse, the electronic device may include a display device that provides a touch panel to enable a user to enter information or commands easily and intuitively.

The touch panel is an input device that enables users to interact with the electronic device by touching a screen. The touch panel may be disposed on top of a display screen including a plurality of pixels. The touch panel may be resistive or capacitive as an example. A resistive touch panel works by detecting pressure and a capacitive touch panel works by detecting changes in capacitance. Touch sensors are embedded within the touch panel and are responsible for detecting changes in electrical properties caused by a touch. The touch sensor generates sensing signals, which may be processed to determine where and how a user is touching the screen. However, when a signal to noise ratio of some of the sensing signals is weak, it may be difficult to properly detect a touch of the touch panel.

SUMMARY

Embodiments of the present disclosure provide a display device in which the performance of touch recognition is increased.

According to an embodiment, a display device includes a pixel, a first sensor, a second sensor, and a first connection transistor. The pixel includes a light emitting element. The first sensor includes a first light sensing element connected to a first sensing node, a second sensor that includes a second light sensing element connected to a second sensing node. The first connection transistor electrically connects the first sensing node of the first sensor and the second sensing node of the second sensor in response to a switching signal.

In an embodiment, the first light sensing element may include a first light sensing anode connected to the first sensing node and a first cathode connected to a driving voltage line, and the second light sensing element may include a second light sensing anode connected to the second sensing node and a second cathode connected to the driving voltage line.

In an embodiment, the first sensor may include a first transistor connected between a reset voltage line and the first sensing node, a second transistor connected between a sensor driving voltage line and an intermediate node and including a gate electrode connected to the first sensing node, and a third transistor connected between the intermediate node and a first readout line and including a gate electrode connected to a scan line.

In an embodiment, the first transistor and the first connection transistor are transistors of a first type, and the second transistor and the third transistor are transistors of a second type different from the first type.

In an embodiment, the second sensor may include a first transistor connected between a reset voltage line and the second sensing node, a second transistor connected between a sensor driving voltage line and an intermediate node and including a gate electrode connected to the second sensing node, and a third transistor connected between the intermediate node and a second readout line and including a gate electrode connected to a scan line.

In an embodiment, the first transistor and the first connection transistor may be transistors of a first type, and the second transistor and the third transistor may be transistors of a second type different from the first type.

In an embodiment, the display device may further include a third sensor including a third light sensing element connected to a third sensing node, and a second connection transistor electrically connecting the second sensing node of the second sensor and the third sensing node of the third sensor in response to the switching signal.

According to an embodiment, a display device includes a display panel, a readout circuit, and a driving controller. The readout circuit receives a first sensing signal and a second sensing signal from the display panel to output a readout signal. The driving controller enables an image to be displayed in the display panel. The display panel includes a pixel that includes a light emitting element, a first sensor that includes a first light sensing element connected to a first sensing node and outputs the first sensing signal, a second sensor that includes a second light sensing element connected to a second sensing node and outputs the second sensing signal, and a first connection transistor that electrically connects the first sensing node of the first sensor and the second sensing node of the second sensor. The driving controller turns on the first connection transistor upon determining that a signal to noise ratio of the readout signal is less than a threshold and otherwise turns off the first connection transistor.

In an embodiment, the first light sensing element may include a first light sensing anode connected to the first sensing node and a first cathode connected to a driving voltage line, and the second light sensing element may include a first light sensing anode connected to the second sensing node and a first cathode connected to the driving voltage line.

In an embodiment, the first sensor may include a first transistor connected between a reset voltage line and the first sensing node, a second transistor connected between a sensor driving voltage line and an intermediate node and including a gate electrode connected to the first sensing node, and a third transistor connected between the intermediate node and a first readout line and including a gate electrode connected to a scan line. The first readout line may output the first sensing signal.

In an embodiment, the first transistor and the first connection transistor may be transistors of a first type, and the second transistor and the third transistor may be transistors of a second type different from the first type.

In an embodiment, the second sensor may include a first transistor connected between a reset voltage line and the second sensing node, a second transistor connected between a sensor driving voltage line and an intermediate node and including a gate electrode connected to the second sensing node, and a third transistor connected between the intermediate node and a second readout line and including a gate electrode connected to a scan line. The second readout line may output the second sensing signal.

In an embodiment, the first transistor and the first connection transistor may be transistors of a first type, and the second transistor and the third transistor may be transistors of a second type different from the first type.

In an embodiment, the display panel may further include a third sensor including a third light sensing element connected to a third sensing node and outputting a third sensing signal, and a second connection transistor electrically connecting the second sensing node of the second sensor and the third sensing node of the third sensor. The driving controller may turn on the second connection transistor upon determining that the signal to noise ratio of the readout signal is less than the threshold and otherwise turns off the second connection transistor.

In an embodiment, a display device includes a base layer, a circuit layer disposed on the base layer, and an element layer disposed on the circuit layer and including a light emitting element, a first light sensing element, and a second light sensing element. The circuit layer includes a first connection transistor connected to the first light sensing element through a first sensing node, connected to the second light sensing element through a second sensing node, and electrically connecting the first sensing node and the second sensing node in response to a switching signal.

In an embodiment, the first light sensing element may include a first light sensing anode connected to the first sensing node and a first cathode connected to a driving voltage line, and the second light sensing element may include a second light sensing anode connected to the second sensing node and a second cathode connected to the driving voltage line.

In an embodiment, the circuit layer may further include a first transistor connected between a reset voltage line and the first sensing node, a second transistor connected between a sensor driving voltage line and an intermediate node and including a gate electrode connected to the first sensing node, and a third transistor connected between the intermediate node and a first readout line and including a gate electrode connected to a scan line.

In an embodiment, the first transistor and the first connection transistor may be transistors of a first type, and the second transistor and the third transistor may be transistors of a second type different from the first type.

In an embodiment, the circuit layer may further include a first transistor connected between a reset voltage line and the second sensing node, a second transistor connected between a sensor driving voltage line and an intermediate node and including a gate electrode connected to the second sensing node, and a third transistor connected between the intermediate node and a second readout line and including a gate electrode connected to a scan line.

In an embodiment, the element layer may further include a third light sensing element, and the circuit layer may further include a second connection transistor connected to the third light sensing element through a third sensing node and electrically connecting the second sensing node and the third sensing node in response to the switching signal.

DETAILED DESCRIPTION

Figure 1:
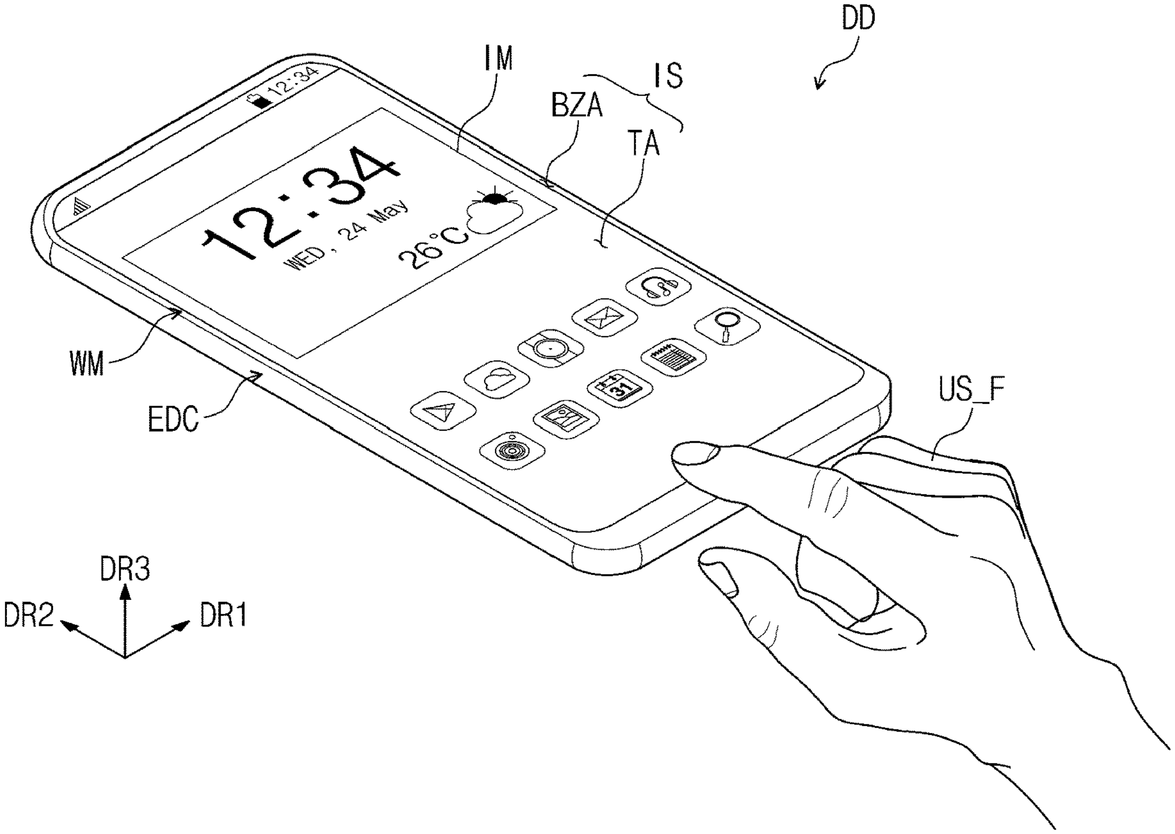
FIG. 1 is a perspective view illustrating a display device according to an embodiment of the present disclosure.

Hereinafter, exemplary embodiments are described in detail with reference to the accompanying drawings; however, they may be embodied in different forms and should not be construed as limited to the embodiments set forth herein. In the specification, the expression that a first component (or region, layer, part, etc.) is "on", "connected to", or "coupled to" a second component means that the first component is directly on, connected to, or coupled to the second component or means that a third component is interposed therebetween. The term "and/or" includes one or more combinations of the associated listed items. The articles "a", "an", and "the" are singular in that they have a single referent, but the use of the singular form in the specification should not preclude the presence of more than one referent. Also, the terms "under", "beneath", "on", "above", etc. are used to describe a relationship between components illustrated in a drawing. The terms are relative and are described with reference to a direction indicated in the drawing.

Below, embodiments of the present disclosure will be described with reference to drawings.

Figure 2:
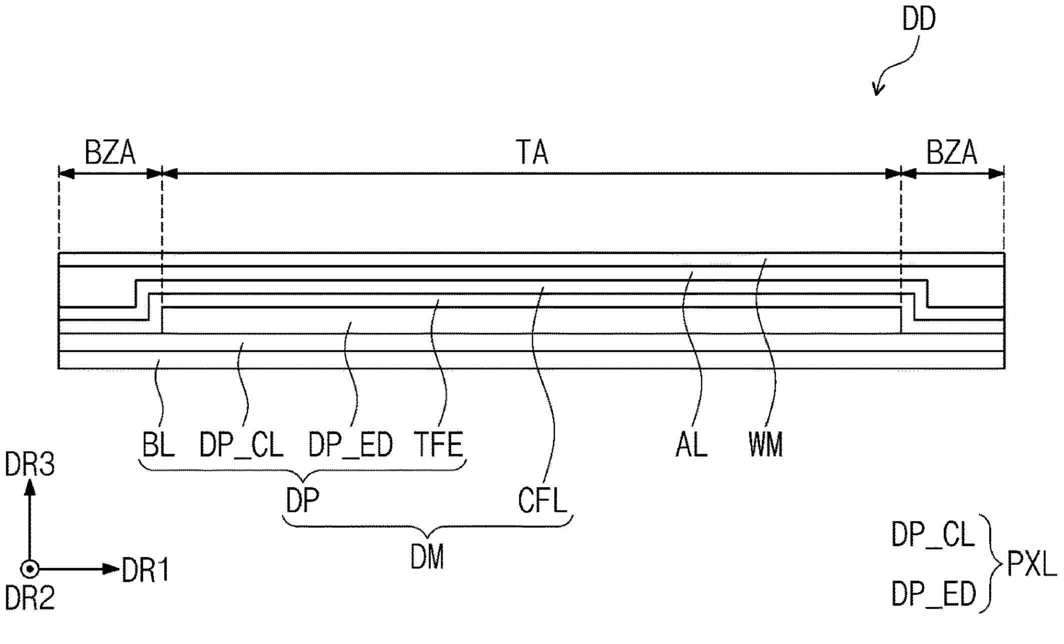
FIG. 2 is a cross-sectional view of a display device according to an embodiment of the present disclosure.

FIG. 1 is a perspective view of a display device DD according to an embodiment of the present disclosure. FIG. 2 is a cross-sectional view of the display device DD according to an embodiment of the present disclosure.

Referring to FIGS. 1 and 2, the display device DD may be a device that is activated depending on an electrical signal. For example, the display device DD may be a mobile phone, a tablet, a car navigation system, a game console, or a wearable device, but the present disclosure is not limited thereto. An example in which the display device DD is a smartphone is illustrated in FIG. 1.

Also, a rigid-type display device DD of a bar shape is illustrated in FIG. 1 as an example, but the present disclosure is not limited thereto. For example, the display device DD may be a foldable, rollable, or slidable display device DD.

The upper surface of the display device DD may be defined as a display surface IS and may have a plane defined by a first direction DR1 and a second direction DR2. Images IM generated by the display device DD may be provided to the user through the display surface IS. Below, a normal direction that is substantially perpendicular to the plane defined by the first direction DR1 and the second direction DR2 is defined as a third direction DR3. In the specification, the expression "when viewed from above a plane" or "in a plan view" may mean "when viewed in the third direction DR3". That is, the plane may be parallel to the surface defined by the first direction DR1 and the second direction DR2.

The display surface IS may be divided into a transparent area TA and a bezel area BZA. The transparent area TA may be an area in which the images IM are displayed. The user visually perceives the images IM through the transparent area TA. In an embodiment, the transparent area TA is illustrated in the shape of a quadrangle whose vertexes are rounded. However, this is merely illustrated as an example since the transparent area TA may have various shapes and is not limited to any one embodiment.

The bezel area BZA is adjacent to the transparent area TA. The bezel area BZA may have a given color. The bezel area BZA may surround the transparent area TA. As such, a shape of the transparent area TA may be defined substantially by the bezel area BZA. However, this is illustrated as an example. The bezel area BZA may be disposed adjacent to only one side of the transparent area TA or may be omitted.

The display device DD may sense an external input applied from the outside. The external input may include various types of inputs that are provided from the outside of the display device DD. For example, in addition to a contact by a part of a body such as a user's hand US_F, the external input may include an external input (e.g., hovering) that is applied in a state where the user's hand US_F approaches the display device DD or is adjacent to the display device DD within a given distance. Also, the external input may be one of various types such as a force type, a pressure type, a temperature type, and a light type. The external input may be provided by a separate device, for example, an active pen or a digitizer pen. Also, the display device DD may sense biometric information of the user applied from the outside. For example, the biometric information may be data used to identify or verify an induvial based on their unique biological or behavioral characteristics.

The exterior of the display device DD may be implemented by a window WM and a housing EDC. For example, the window WM and the housing EDC may be coupled to each other. The remaining components of the display device DD, for example, a display module DM may be accommodated within a space formed by the window WM and the housing EDC thus coupled.

The front surface of the window WM defines the display surface IS of the display device DD. The window WM may include an optically transparent material. For example, the window WM may include glass or plastic. The window WM may have a multi-layer structure or a single-layer structure. For example, the window WM may include a plurality of plastic films bonded by an adhesive or may have a glass substrate and a plastic film bonded by an adhesive.

The housing EDC may include a material whose rigidity is relatively high. For example, the housing EDC may include glass, plastic, or metal or may include a plurality of frames and/or plates that are composed of a combination thereof. The housing EDC may stably protect components of the display device DD accommodated in the inner space from an external impact. A battery module (e.g., a battery) for supplying a power used for an overall operation of the display device DD may be interposed between the display module DM and the housing EDC.

The display module DM may include a display panel DP and an anti-reflection layer CFL.

The display panel DP may be a component that generates an image. The display panel DP may be a light emitting display panel. For example, the display panel DP may be an organic light emitting display panel, an inorganic light emitting display panel, an organic-inorganic light emitting display panel, a quantum dot display panel, a micro light-emitting diode (micro-LED) display panel, or a nano-LED display panel. Below, the description will be given based on the assumption that the display panel DP is the organic light emitting display panel.

The display panel DP includes a base layer BL, a pixel layer PXL, and an encapsulation layer TFE. The display panel DP according to the present disclosure may be a flexible display panel. However, the present disclosure is not limited thereto. For example, the display panel DP may be a foldable display panel, which is folded about to a folding axis, or a rigid display panel.

The base layer BL may include a synthetic resin layer. The synthetic resin layer may be a polyimide-based resin layer, but is limited thereto. The base layer BL may include a glass substrate, a metal substrate, an organic/inorganic composite material substrate, etc.

The pixel layer PXL is disposed on the base layer BL. The pixel layer PXL may include a circuit layer DP_CL and an element layer DP_ED. The circuit layer DP_CL is interposed between the base layer BL and the element layer DP_ED.

In an embodiment, the circuit layer DP_CL includes at least one insulating layer and a circuit element. Below, the insulating layer included in the circuit layer DP_CL is referred to as an "intermediate insulating layer". In an embodiment, the intermediate insulating layer includes at least one intermediate inorganic film and at least one intermediate organic film. The circuit element may include a pixel driving circuit included in each of a plurality of pixels for displaying an image and a sensor driving circuit included in each of a plurality of sensors for recognizing external information. The circuit layer DP_CL may further include signal lines connected to the pixel circuit and/or the sensor driving circuit.

In example embodiments of the present disclosure, each of the plurality of sensors may include a fingerprint recognition sensor, a proximity sensor, an iris recognition sensor, etc. Also, each of the plurality of sensors may include an optical sensor that recognizes biometric information in an optical manner. According to an embodiment of the present disclosure, the plurality of sensors may be used to sense an external input (e.g., a touch of the user) as well as biometric information such as a fingerprint. Accordingly, the display device DD may not include a separate input sensing layer for sensing an external input. In this case, the thickness of the display device DD may be further reduced, and thus, flexibility may be increased. This may make it possible to implement the display device DD in various types, for example, to implement the foldable, rollable, or slidable display device DD described above.

The element layer DP_ED may include a light emitting element included in each of the pixels and a light sensing element included in each of the sensors. In an example embodiment of the present disclosure, the light sensing element may be a photodiode. The light sensing element may be a sensor that senses light reflected by a fingerprint of the user or reacts to light. The circuit layer DP_CL and the element layer DP_ED will be described in detail with reference to FIG. 8.

The encapsulation layer TFE seals up the element layer DP_ED. The encapsulation layer TFE may include at least one organic film and at least one inorganic film. The inorganic film may include an inorganic material and may protect the element layer DP_ED from moisture and/or oxygen. The inorganic film may include a silicon nitride layer, a silicon oxynitride layer, a silicon oxide layer, a titanium oxide layer, an aluminum oxide layer, or the like but is not limited thereto. The organic film may include an organic material and may protect the element layer DP_ED from foreign objects such as dust particles.

The anti-reflection layer CFL may be disposed on the display panel DP. The anti-reflection layer CFL may reduce the reflectance of an external light incident from the outside of the display device DD. The anti-reflection layer CFL may be formed on the display panel DP through a continuous process, but the present disclosure is not limited thereto. For example, the anti-reflection layer CFL may include color filters, a black matrix, and a planarization layer. The color filters may have a certain arrangement. For example, the color filters may be arranged in consideration of colors of lights emitted from the pixels included in the display panel DP. In another embodiment, the anti-reflection layer CFL may include a black matrix and a reflection control layer. The reflection control layer may selectively absorb a light reflected from the inside of the display panel DP and/or an electronic device and/or a light belonging to a partial band from among light incident from the outside of the display panel DP and/or the electronic device. In another embodiment, the anti-reflection layer CFL may be a polarization film.

The display device DD according to an embodiment of the present disclosure may further include an adhesive layer AL. The window WM may be attached to the anti-reflection layer CFL by the adhesive layer AL. The adhesive layer AL may include an optical clear adhesive, an optically clear adhesive resin, or a pressure sensitive adhesive (PSA).

Figure 3:
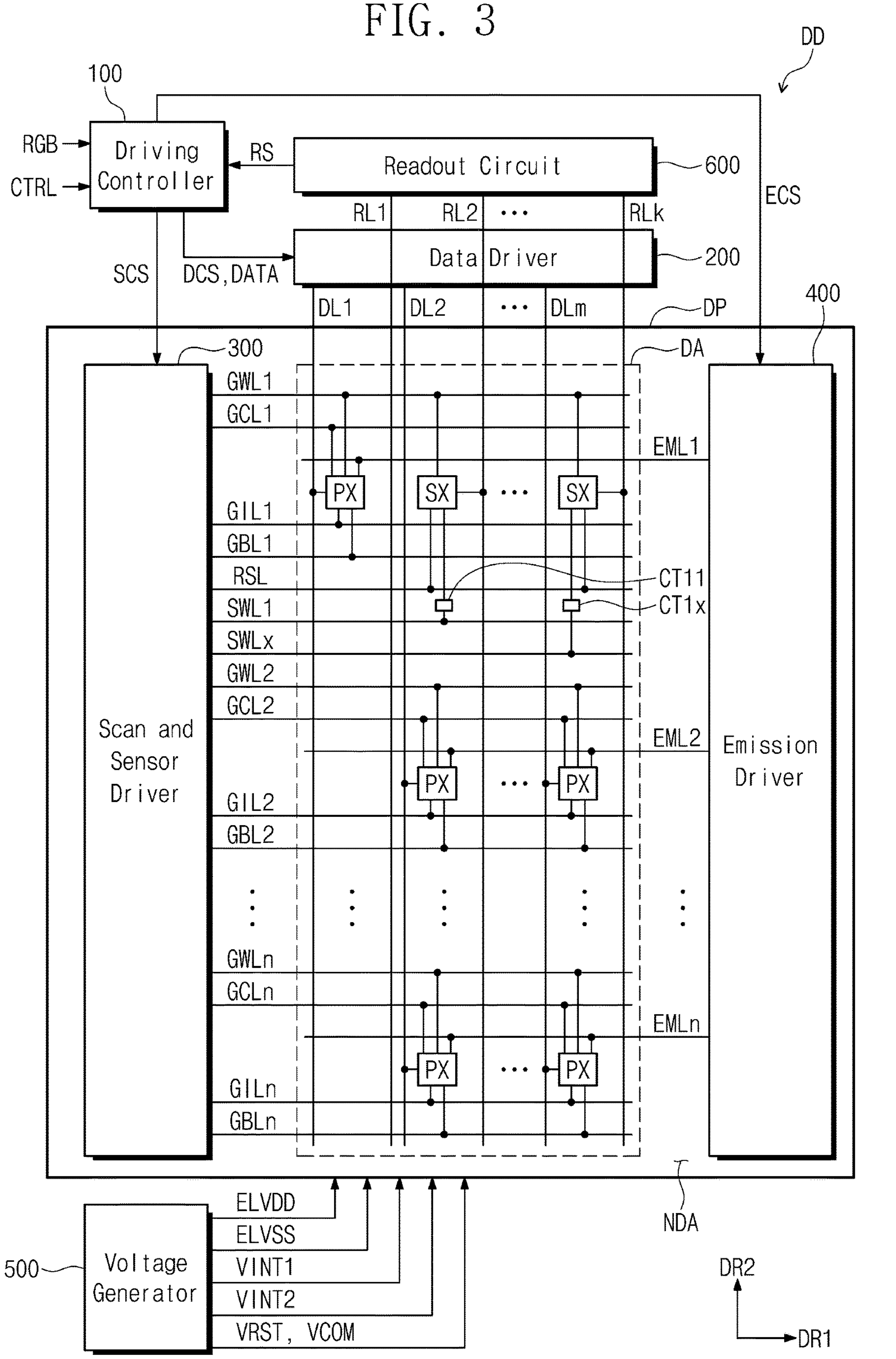
FIG. 3 is a block diagram of a display device according to an embodiment of the present disclosure.

FIG. 3 is a block diagram of a display device according to an embodiment of the present disclosure.

Referring to FIG. 3, the display device DD includes the display panel DP, a driving controller 100 (e.g., a controller circuit), a data driver 200 (e.g., a first driver circuit), a scan and sensor driver 300 (e.g., a second driver circuit), an emission driver 400 (e.g., a third driver circuit), a voltage generator 500, and a readout circuit 600.

The driving controller 100 enables an image to be displayed in the display panel DP. The driving controller 100 receives an input image signal RGB and a control signal CTRL. The driving controller 100 generates an output image signal DATA by converting a data format of the input image signal RGB so as to be appropriate for the data driver 200 and the display panel DP. The driving controller 100 outputs a scan control signal SCS, a data control signal DCS, and an emission control signal ECS.

The data driver 200 receives the data control signal DCS and the output image signal DATA from the driving controller 100. The data driver 200 converts the output image signal DATA into data signals and then outputs the data signals to a plurality of data lines DL1 to DLm to be described later. The data signals refer to analog voltages corresponding to a gray level of the output image signal DATA.

The voltage generator 500 generates voltages used for the operation of the display panel DP. In an embodiment, the voltage generator 500 generates a first driving voltage ELVDD, a second driving voltage ELVSS, a first initialization voltage VINT1, a second initialization voltage VINT2, a reset voltage VRST, and a sensor driving voltage VCOM.

The display panel DP includes scan lines GIL1 to GILn, GCL1 to GCLn, GWL1 to GWLn, and GBL1 to GBLn, a reset line RSL, emission lines EML1 to EMLn, the data lines DL1 to DLm, readout lines RL1 to RLk, pixels PX, and sensors SX.

The display panel DP may include a display area DA corresponding to the transparent area TA (refer to FIG. 1) and a non-display area NDA corresponding to the bezel area BZA (illustrated in FIG. 1). The pixels PX and the sensors SX may be disposed in the display area DA.

The scan and sensor driver 300 and the emission driver 400 may be disposed in the non-display area NDA of the display panel DP.

In an embodiment, the scan and sensor driver 300 is disposed adjacent to a first side of the display area DA in the display panel DP. The scan and sensor driver 300 receives the scan control signal SCS from the driving controller 100. The scan and sensor driver 300 may output scan signals to the scan lines GIL1 to GILn, GCL1 to GCLn, GWL1 to GWLn, and GBL1 to GBLn in response to the scan control signal SCS and may output a reset signal to the reset line RSL. The scan lines GIL1 to GILn, GCL1 to GCLn, GWL1 to GWLn, and GBL1 to GBLn extend from the scan and sensor driver 300 in the first direction DR1.

In an embodiment, the scan and sensor driver 300 may provide switching signals to switching lines SWL1 to SWLx in response to the scan control signal SCS.

The emission driver 400 is disposed adjacent to a second side of the display area DA in the display panel DP. The emission driver 400 receives the emission control signal ECS from the driving controller 100. The emission driver 400 may output emission signals to the emission lines EML1 to EMLn in response to the emission control signal ECS. The emission lines EML1 to EMLn extend from the emission driver 400 in a direction facing away from the first direction DR1 or in a direction opposite to the first direction DR1.

The scan lines GIL1 to GILn, GCL1 to GCLn, GWL1 to GWLn, and GBL1 to GBLn, the reset line RSL, and the emission lines EML1 to EMLn are arranged to be spaced from each other in the second direction DR2. The data lines DL1 to DLm extend from the data driver 200 in a direction facing away from the second direction DR2 and are arranged to be spaced from each other in the first direction DR1. For example, the data lines DL1 to DLm mat extend from the data driver 200 in a direction opposite to the second direction DR2.

The plurality of pixels PX are electrically connected to the scan lines GIL1 to GILn, GCL1 to GCLn, GWL1 to GWLn, and GBL1 to GBLn, the emission lines EML1 to EMLn, and the data lines DL1 to DLm. In an embodiment, each of the plurality of pixels PX may be electrically connected to four scan lines and one emission line. For example, as illustrated in FIG. 3, the pixels PX belonging to the first row may be connected to the scan lines GIL1, GCL1 and GWL1 and the emission line EML1. Also, the pixels PX belonging to the second row may be connected to the scan lines GIL2, GCL2 and GWL2 and the emission lines EML3.

Each of the plurality of pixels PX includes a light emitting element ED (refer to FIG. 5) and a pixel circuit PDC (refer to FIG. 5) controlling the emission of the light emitting element ED. The pixel circuit PDC may include one or more transistors and one or more capacitors. The scan and sensor driver 300 and the emission driver 400 may include transistors formed through the same process as the pixel circuit PDC.

Each of the plurality of pixels PX receives the first driving voltage ELVDD, the second driving voltage ELVSS, the first initialization voltage VINT1, and the second initialization voltage VINT2 from the voltage generator 500.

Figure 5:
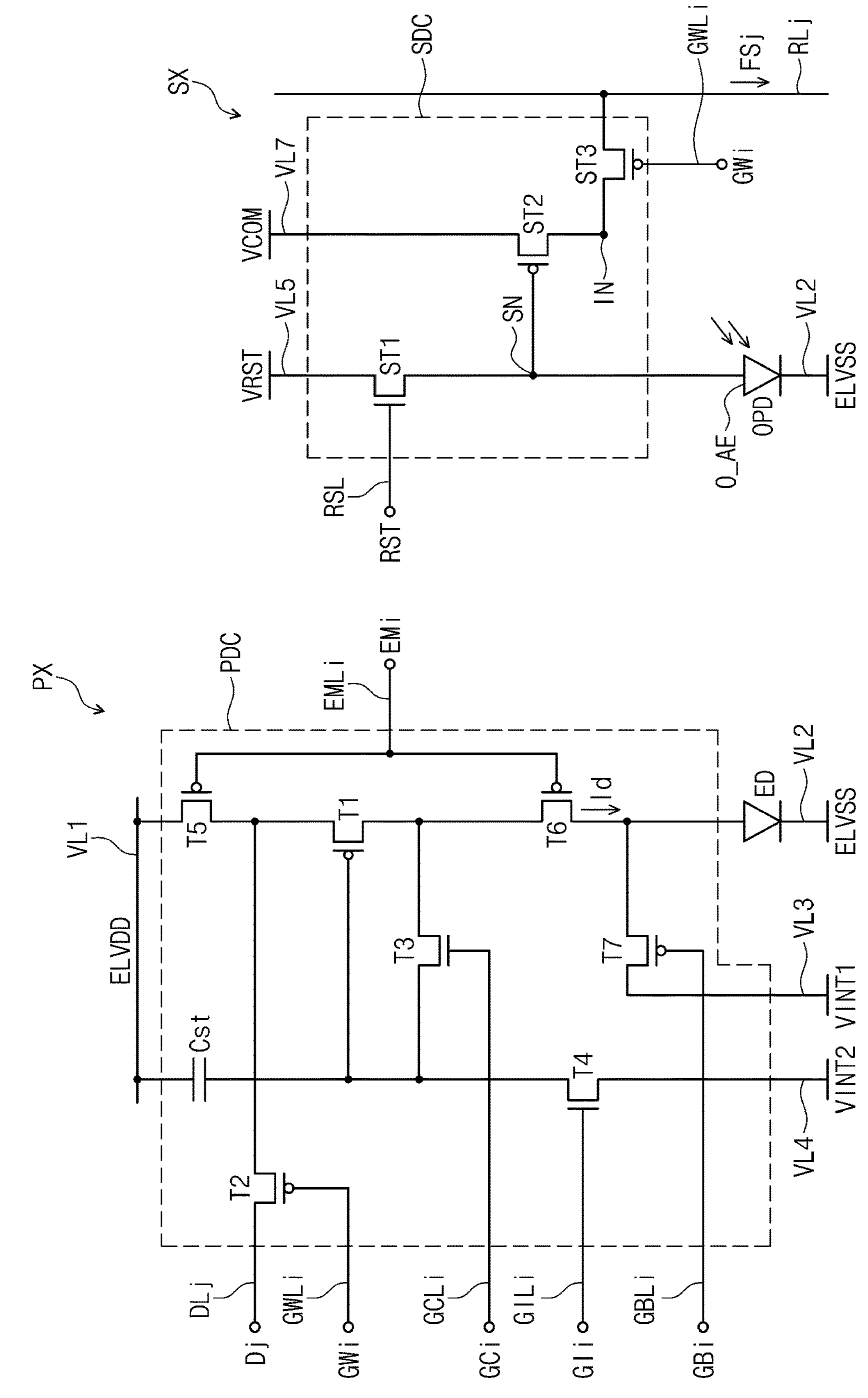
FIG. 5 is a circuit diagram of a pixel and a sensor according to an embodiment of the present disclosure.

Each of the sensors SX includes a light sensing element OPD (refer to FIG. 5) and a sensor driving circuit SDC (refer to FIG. 5). The sensor driving circuit SDC may include transistors formed through the same process as the pixel circuit PDC.

Each of the sensors SX may be connected to a corresponding scan line among the scan lines GWL1 to GWLn and a corresponding readout line among the readout lines RL1 to RLk. The sensors SX may be connected in common to the reset line RSL. In an embodiment, the number of sensors SX may be less than the number of pixels PX. However, the present disclosure is not limited thereto. In an embodiment, the number of sensors SX disposed in the display panel DP may be greater than or equal to the number of pixels PX. In an embodiment, the number of readout lines RL1 to RLk is less than the number of data lines DL1 to DLm. That is, k<m. However, the present disclosure is not limited thereto. In an embodiment, the number of readout lines RL1 to RLk disposed in the display panel DP is greater than or equal to the number of data lines DL1 to DLm.

The readout circuit 600 may receive sensing signals from the readout lines RL1 to RLk and may output a readout signal RS to the driving controller 100.

In an embodiment, the sensors SX and the readout circuit 600 operate in a biometric sensing mode or a touch sensing mode. In an embodiment, the sensors SX and the readout circuit 600 sense information about blood pressure or a fingerprint of the user in the biometric sensing mode. In an embodiment, the sensors SX and the readout circuit 600 sense a location of a user touch in the touch sensing mode.

In the example illustrated in FIG. 3, the scan and sensor driver 300 is disposed to face the emission driver 400, with the pixels PX interposed therebetween, but the present disclosure is not limited thereto. For example, the scan and sensor driver 300 and the emission driver 400 may be disposed side by side at a location adjacent to one of the first side and the second side of the display area DA in the display panel DP. In an embodiment, the scan and sensor driver 300 and the emission driver 400 may be implemented with a single circuit.

In an embodiment, the display panel DP may further include connection transistors CT11 to CT1x. The connection transistor CT11 may be connected to the switching line SWL1, and the connection transistor CT1x may be connected to the switching line SWLx. How the connection transistors CT11 to CT1x and the sensors SX are connected will be described below in detail.

Figure 4:
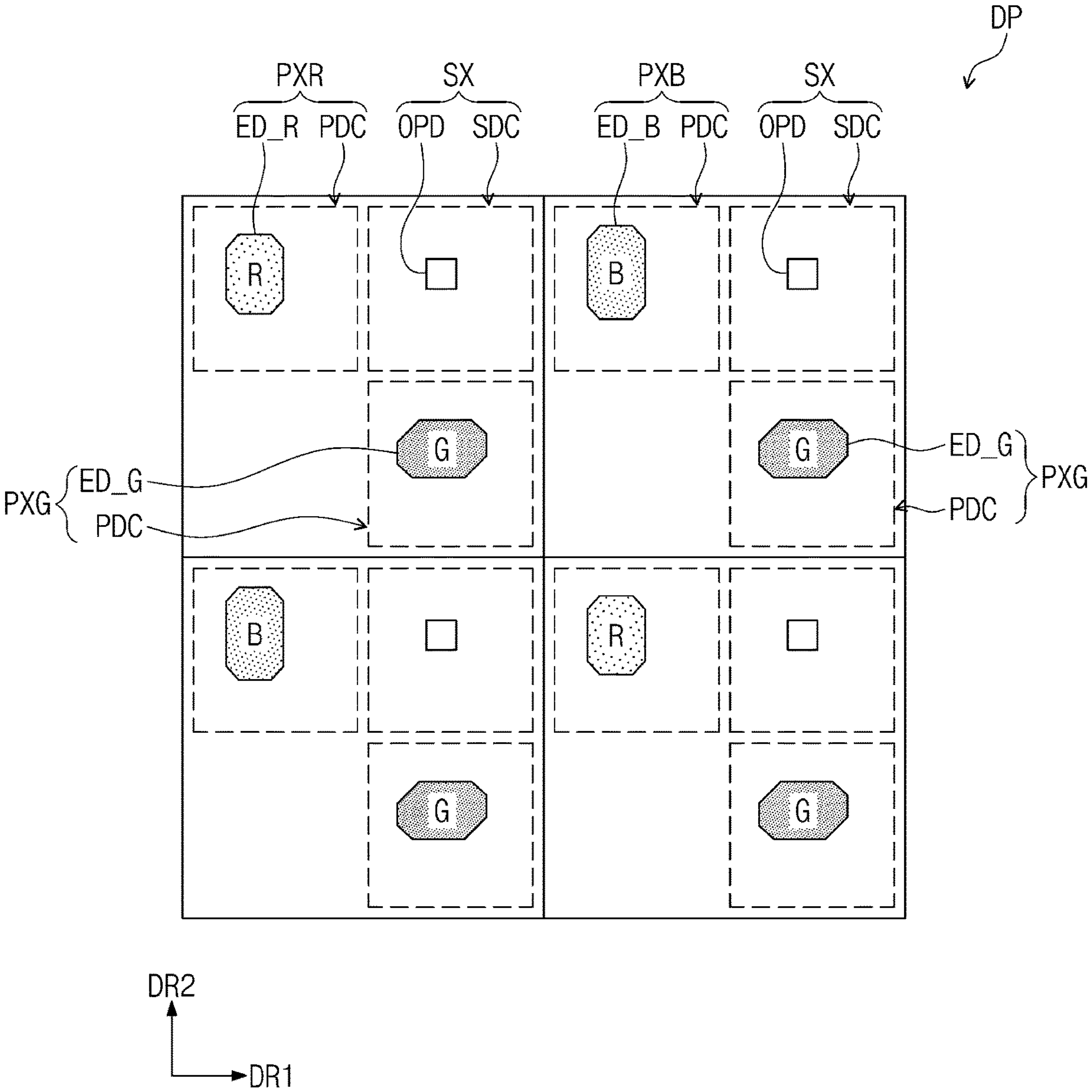
FIG. 4 is an enlarged plan view of a partial area of a display panel according to embodiments of the present disclosure.

FIG. 4 is an enlarged plan view of a partial area of the display panel DP according to an embodiment of the present disclosure.

Referring to FIG. 4, pixels PXR, PXG, and PXB are disposed in the display panel DP. Each of the pixels PXR, PXG, and PXB includes a light emitting element (one of ED_R, ED_G, and ED_B) and the pixel circuit PDC. Each of the pixels PX illustrated in FIG. 3 may correspond to one of the pixels PXR, PXG, and PXB illustrated in FIG. 4. Each of the sensors SX includes the light sensing element OPD and the sensor driving circuit SDC.

Referring to FIG. 4, the pixels PXR and PXB and the sensors SX are disposed at odd-numbered rows, that is, the first row and the third row. In an embodiment, the pixels PXR and PXB and the sensors SX are alternately disposed in the first direction DR1 for each of the first and third rows. Only the pixels PXB are disposed at the second row.

In an embodiment, the pixel PXR may include the light emitting element ED_R outputting a light of a first color (e.g., a red). The pixel PXG may include the light emitting element ED_G outputting a light of a second color (e.g., a green). The pixel PXB may include the light emitting element ED_B outputting a light of a third color (e.g., a blue).

As illustrated in FIG. 4, the pixels PXR and PXB may be alternately and repeatedly disposed in the second direction DR2 as well as in the first direction DR1. The pixels PXG may be arranged in the second direction DR2 such that each pixel PXG is interposed between two light sensing elements OPD.

The structure in which the pixels PX and the sensors SX are arranged may be variously changed or modified without limitation to FIG. 4.

In an embodiment, the light emitting element ED_R may be larger in size than the light emitting element ED_G. Also, the size of the light emitting element ED_B may be larger than or equal to the size of the light emitting element ED_R. The size of each of the light emitting elements ED_R, ED_G, and ED_B is not limited thereto and may be variously changed and applied. For example, in another embodiment of the present disclosure, the light emitting elements ED_R, ED_G, and ED_B may have the same size.

Also, each of the light emitting elements ED_R, ED_G, and ED_B may be implemented in various shapes such as a polygon, a circle, and an ellipse. In an embodiment, the light emitting elements ED_R, ED_G, and ED_B may be implemented in different shapes. For example, the light emitting element ED_G may be in the shape of a circle, the light emitting elements ED_R and ED_B may be in the shape of a quadrangle.

In an embodiment, the area occupied by the sensor driving circuit SDC may be different from the area occupied by the pixel circuit PDC. For example, the area of the sensor driving circuit SDC may be smaller than the area of the pixel circuit PDC.

FIG. 5 is a circuit diagram of the pixel PX and the sensor SX according to an embodiment of the present disclosure.

FIG. 5 shows one pixel PX among the plurality of pixels PX illustrated in FIG. 3 and one sensor SX among the plurality of sensors SX illustrated in FIG. 3. Each of the plurality of pixels PX illustrated in FIG. 3 may have the same circuit configuration as the pixel PX illustrated in FIG. 5. Also, each of the plurality of sensors SX illustrated in FIG. 3 may have the same circuit configuration as the sensor SX illustrated in FIG. 5.

Referring to FIG. 5, the pixel PX includes the pixel circuit PDC and at least one light emitting element ED. The light emitting element ED may be a light emitting diode. As an example of the present disclosure, the light emitting element ED may be an organic light emitting diode including an organic emission layer. The pixel circuit PDC according to an embodiment includes first to seventh transistors T1, T2, T3, T4, T5, T6, and T7 and one capacitor Cst.

The third and fourth transistors T3 and T4 among the first to seventh transistors T1 to T7 may be N-type transistors that use an oxide semiconductor as a semiconductor layer, and each of the first, second, fifth, sixth, and seventh transistors T1, T2, T5, T6, and T7 may be P-type transistors that have a low-temperature polycrystalline silicon (LTPS) semiconductor layer. However, the present disclosure is not limited thereto. In an embodiment, all the first to seventh transistors T1 to T7 may be P-type transistors. In an embodiment, all the first to seventh transistors T1 to T7 may be N-type transistors. In an embodiment, at least one of the first to seventh transistors T1 to T7 may be an N-type transistor, and the others thereof may be P-type transistors. A configuration of the pixel circuit PDC according to the present disclosure is not limited to the embodiment illustrated in FIG. 5. The pixel circuit PDC illustrated in FIG. 5 is provided merely as an example, and the configuration of the pixel circuit PDC may be variously modified and implemented.

The pixel PX is electrically connected to the scan lines GILi, GCLi, GWLi, and GBLi, the emission line EMLi, and the data line DLj. The scan lines GILi, GCLi, GWLi, and GBLi may respectively transfer scan signals GIi, GCi, GWi, and GBi, and the emission line EMLi may transfer an emission control signal EMi. The data line DLj transfers a data signal Dj. The data signal Dj may have a voltage level corresponding to the input image signal RGB input to the display device DD (refer to FIG. 3). First to fourth driving voltage lines VL1, VL2, VL3, and VL4 may respectively transfer the first driving voltage ELVDD, the second driving voltage ELVSS, the first initialization voltage VINT1, and the second initialization voltage VINT2.

The first transistor T1 includes a first electrode connected to the first driving voltage line VL1 through the fifth transistor T5, a second electrode electrically connected to an anode of the light emitting element ED through the sixth transistor T6, and a gate electrode connected to a first end of the capacitor Cst. The first transistor T1 may receive the data signal Dj transferred through the data line DLj depending on a switching operation of the second transistor T2 and may supply a driving current Id to the light emitting element ED.

The second transistor T2 includes a first electrode connected to the data line DLj, a second electrode connected to the first electrode of the first transistor T1, and a gate electrode connected to the scan line GWLi. The second transistor T2 may be turned on depending on the scan signal GWi transferred through the scan line GWLi and may transfer the data signal Dj from the data line DLj to the first electrode of the first transistor T1.

The third transistor T3 includes a first electrode connected to the gate electrode of the first transistor T1, a second electrode connected to the second electrode of the first transistor T1, and a gate electrode connected to the scan line GCLi. The third transistor T3 may be turned on depending on the scan signal GCi transferred through the scan line GCLi. Thus, the gate electrode and the second electrode of the first transistor T1 may be connected to each other, that is, the first transistor T1 may be diode-connected.

The fourth transistor T4 includes a first electrode connected to the gate electrode of the first transistor T1, a second electrode connected to the fourth driving voltage line VL4 through which the second initialization voltage VINT2 is transferred, and a gate electrode connected to the scan line GILi. The fourth transistor T4 may be turned on depending on the scan signal GIi transferred through the scan line GILi. Thus, the second initialization voltage VINT2 may be transferred to the gate electrode of the first transistor T1. As such, a voltage of the gate electrode of the first transistor T1 may be initialized. This operation may be referred to as an "initialization operation".

The fifth transistor T5 includes a first electrode connected to the first driving voltage line VL1, a second electrode connected to the first electrode of the first transistor T1, and a gate electrode connected to the emission line EMLi.

The sixth transistor T6 includes a first electrode connected to the second electrode of the first transistor T1, a second electrode connected to the anode of the light emitting element ED, and a gate electrode connected to the emission line EMLi.

The fifth transistor T5 and the sixth transistor T6 may be simultaneously turned on depending on the emission control signal EMi transferred through the emission line EMLi. Thus, the first driving voltage ELVDD may be compensated for through the diode-connected transistor T1 so as to be supplied to the light emitting element ED.

The seventh transistor T7 includes a first electrode connected to the anode of the light emitting element ED, a second electrode connected to the third driving voltage line VL3, and a gate electrode connected to the scan line GBLi. The seventh transistor T7 may be turned on depending on the scan signal GBi transferred through the scan line GBLi and may electrically connect the anode of the light emitting element ED with the third driving voltage line VL3.

The first end of the capacitor Cst is connected to the gate electrode of the first transistor T1, and a second end of the capacitor Cst is connected to the first driving voltage line VL1. A cathode of the light emitting element ED may be connected to the second driving voltage line VL2 transferring the second driving voltage ELVSS. However, the structure of the pixel PX is not limited to the example illustrated in FIG. 5. For example, in one pixel PX, the number of transistors, the number of capacitors, and the connection relationship thereof may be variously changed or modified.

The sensor SX is electrically connected to the scan line GWLi, the reset line RSL, and the readout line RLj.

The sensor SX includes the light sensing element OPD and the sensor driving circuit SDC. The light sensing element OPD may be a photodiode. As an example of the present disclosure, the light sensing element OPD may be an organic photodiode including an organic material as a photoelectric conversion layer. A light sensing anode O_AE of the light sensing element OPD may be connected to a sensing node SN, and a cathode thereof may be connected to the second driving voltage line VL2 transferring the second driving voltage ELVSS. In an embodiment, the cathode of the light sensing element OPD in the sensor SX receives the second driving voltage ELVSS provided to the cathode of the light emitting element ED in the pixel PX, but the present disclosure is not limited thereto. A voltage that is provided to the cathode of the light sensing element OPD in the sensor SX may be a voltage different from the second driving voltage ELVSS.

The sensor driving circuit SDC includes transistors ST1, ST2, and ST3. The transistors ST1, ST2, and ST3 may be the reset transistor ST1, the amplification transistor ST2, and the output transistor ST3, respectively. The transistors ST1, ST2, and ST3 may be also referred to as a "first transistor ST1", a "second transistor ST2", and a "third transistor ST3", respectively.

Some of the reset transistor ST1, the amplification transistor ST2, and the output transistor ST3 may be P-type transistors, and the other(s) thereof may be an N-type transistor. In an embodiment, the reset transistor ST1 may be the same N-type transistor as the third transistor T3 of the pixel PX illustrated in FIG. 5, and the amplification transistor ST2 and the output transistor ST3 may be the same P-type transistors as the first and second transistors T1 and T2 of the pixel PX illustrated in FIG. 5. However, the present disclosure is not limited thereto. In an embodiment, all of the reset transistor ST1, the amplification transistor ST2, and the output transistor ST3 may be P-type transistors.

In another embodiment, all of the reset transistor ST1, the amplification transistor ST2, and the output transistor ST3 may be N-type transistors.

The reset transistor ST1 includes a first electrode connected to a reset voltage line VL5 receiving the reset voltage VRST, a second electrode connected to the sensing node SN, and a gate electrode connected to the reset line RSL receiving a reset signal RST. The reset transistor ST1 may reset a potential of the sensing node SN to the reset voltage VRST in response to the reset signal RST.

The amplification transistor ST2 includes a first electrode connected to a sensor driving voltage line VL7 receiving the sensor driving voltage VCOM, a second electrode connected to an intermediate node IN, and a gate electrode connected to the sensing node SN. In an embodiment, the voltage level of the sensor driving voltage VCOM may be equal to the voltage level of one of the first driving voltage ELVDD, the first initialization voltage VINT1, or the second initialization voltage VINT2, which is provided to the pixel PX illustrated in FIG. 5. The amplification transistor ST2 may provide a current corresponding to the potential of the sensing node SN to the intermediate node IN.

The output transistor ST3 includes a first electrode connected to the intermediate node IN, a second electrode connected to the readout line RLj, and a gate electrode connected to the scan line GWLi receiving the scan signal GWi. The output transistor ST3 may transfer a sensing signal FSj to the readout line RLj in response to the scan signal GWi.

The circuit configuration of the sensor driving circuit SDC according to the present disclosure is not limited to FIG. 5. The sensor driving circuit SDC illustrated in FIG. 5 is provided merely as an example, and the configuration of the sensor driving circuit SDC may be variously modified and implemented.

Figure 6:
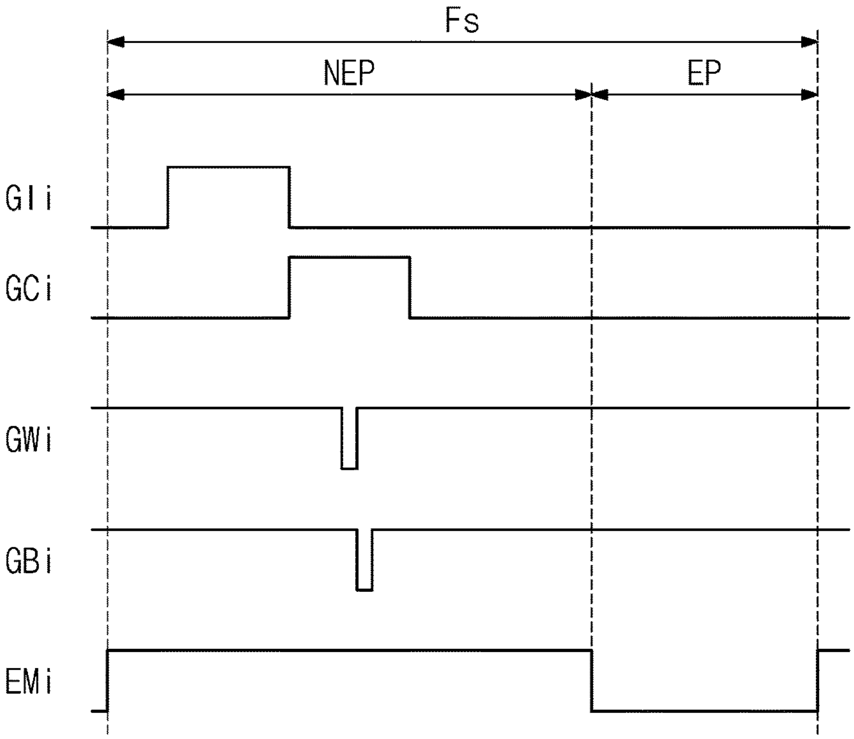
FIG. 6 is a timing diagram for describing an operation of a pixel illustrated in FIG. 5.

FIG. 6 is a timing diagram for describing an operation of a pixel illustrated in FIG. 5.

Referring to FIGS. 5 and 6, one frame period Fs may include an emission period EP and a non-emission period NEP. The emission period EP may correspond to a low-level period (i.e., an active period) of the emission control signal EMi, and the non-emission period NEP may correspond to a high-level period (i.e., an inactive period) of the emission control signal EMi.

The non-emission period NEP may include an initialization period and a data programming and compensation period.

When the scan signal GIi of the high level is provided through the scan line GILi during the initialization period, the fourth transistor T4 is turned on. The second initialization voltage VINT2 is transferred to the gate electrode of the first transistor T1 through the fourth transistor T4, and thus, the first transistor T1 is initialized.

In an embodiment, when the scan signal GCi of the high level is supplied through the scan line GCLi during the data programming and compensation period, the third transistor T3 is turned on. The first transistor T1 is diode-connected by the third transistor T3 thus turned on and is forward-biased. In this case, when the scan signal GWi of the low level is supplied through the scan line GWLi, the second transistor T2 is turned on. As such, a compensation voltage that is obtained by subtracting the threshold voltage of the first transistor T1 from the voltage of the data signal Dj supplied from the data line DLj is applied to the gate electrode of the first transistor T1. That is, a gate voltage applied to the gate electrode of the first transistor T1 may be the compensation voltage.

Since the first driving voltage ELVDD and the compensation voltage are respectively applied to the opposite ends of the capacitor Cst, charges whose amount corresponds to a difference between the first driving voltage ELVDD and the compensation voltage may be stored in the capacitor Cst.

Meanwhile, the seventh transistor T7 is turned on in response to the scan signal GBi of low level, which is transferred through the scan line GBLi. When the seventh transistor T7 is turned on, the anode of the light emitting element ED is electrically connected to the third driving voltage line VL3. Accordingly, the anode of the light emitting element ED may be initialized with the first initialization voltage VINT1.

Afterwards, during the emission period EP, the emission control signal EMi supplied from the emission line EMLi transitions from the high level to the low level. During the emission period EP, the fifth transistor T5 and the sixth transistor T6 are turned on by the emission control signal EMi of the low level. In this case, the driving current Id is generated depending on a difference between the gate voltage of the gate electrode of the first transistor T1 and the first driving voltage ELVDD and is supplied to the light emitting element ED through the sixth transistor T6. That is, the driving current Id flows through the light emitting element ED. The light emitting element ED may emit a light with luminance corresponding to the driving current Id.

Figure 7:
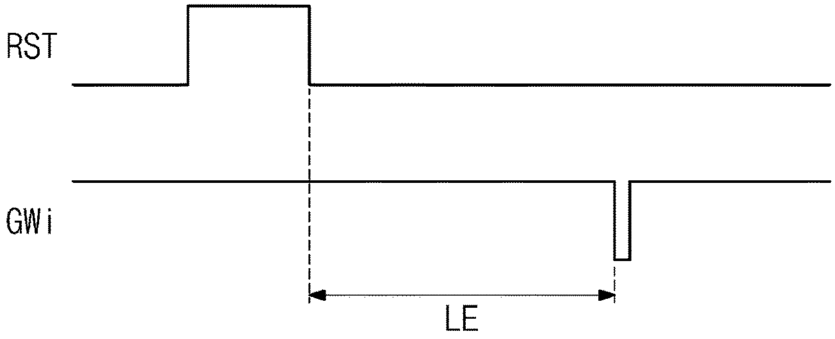
FIG. 7 is a timing diagram for describing an operation of a sensor illustrated in FIG. 5.

FIG. 7 is a timing diagram for describing an operation of the sensor SX illustrated in FIG. 5.

Referring to FIGS. 5 and 7, when the reset signal RST transitions to the high level, the reset transistor ST1 is turned on. When the reset transistor ST1 is turned on, the sensing node SN may be initialized with the reset voltage VRST.

After the reset signal RST transitions to the low level, the sensor SX is exposed to the light during a light exposure period LE. When the user's hand touches a display surface, the light sensing element OPD may generate photoelectrons corresponding the light reflected by the user's hand, and the generated photoelectrons may be accumulated at the sensing node SN.

The amplification transistor ST2 may be a source follower amplifier that generates a source-drain current in proportion to the amount of photoelectrons (or charges) of the sensing node SN, which are input to the gate electrode of the amplification transistor ST2.

While the scan signal GWi is at the inactive level, that is, at the high level, the output transistor ST3 is maintained in the turn-off state. When the scan signal Gwi transitions to the active level, that is, the low level, the output transistor ST3 is turned on. When the output transistor ST3 is turned on, the sensing signal FSj corresponding to the current flowing through the amplification transistor ST2 may be output to the readout line RLj. That is, the sensing signal FSj corresponding to the quantity of light sensed by the light sensing element OPD may be output to the readout line RLj.

In an embodiment, the scan signal Gwi may be the same signal as the scan signal Gwi illustrated in FIGS. 5 and 6. That is, the pixels PX and the sensors SX disposed at the i-th row illustrated in FIG. 3 may receive the same scan signal Gwi.

In an embodiment, in the biometric sensing mode, the light sensing element OPD may generate photoelectrons corresponding to the light reflected by a ridge of a fingerprint or a valley between ridges of a fingerprint. The sensing signal FSj output from the sensor SX in the biometric sensing mode may be a signal corresponding to the user's fingerprint. For example, the user's fingerprint may be derived from the sensing signal FSj in a first biometric sensing mode.

In an embodiment, in the biometric sensing mode, the light sensing element OPD may generate photoelectrons corresponding to the light reflected from a blood vessel located under a dermal layer of the user's skin. In the systole, the blood moves to the periphery, increasing arterial blood volume; in the diastole, the blood volume decreases. This change in blood volume changes the reflected light. The sensing signal FSj output from the sensor SX in the biometric sensing mode may be a signal corresponding to the user's blood pressure. For example, the user's blood pressure may be derived from the sensing signal FSj in a second biometric sensing mode.

In an embodiment, in the touch sensing mode, the light sensing element OPD may generate photoelectrons corresponding to the light reflected by the user touch. The sensing signal FSj output from the sensor SX in the touch sensing mode may be a signal indicating whether a touch is made by the user.

Figure 8:
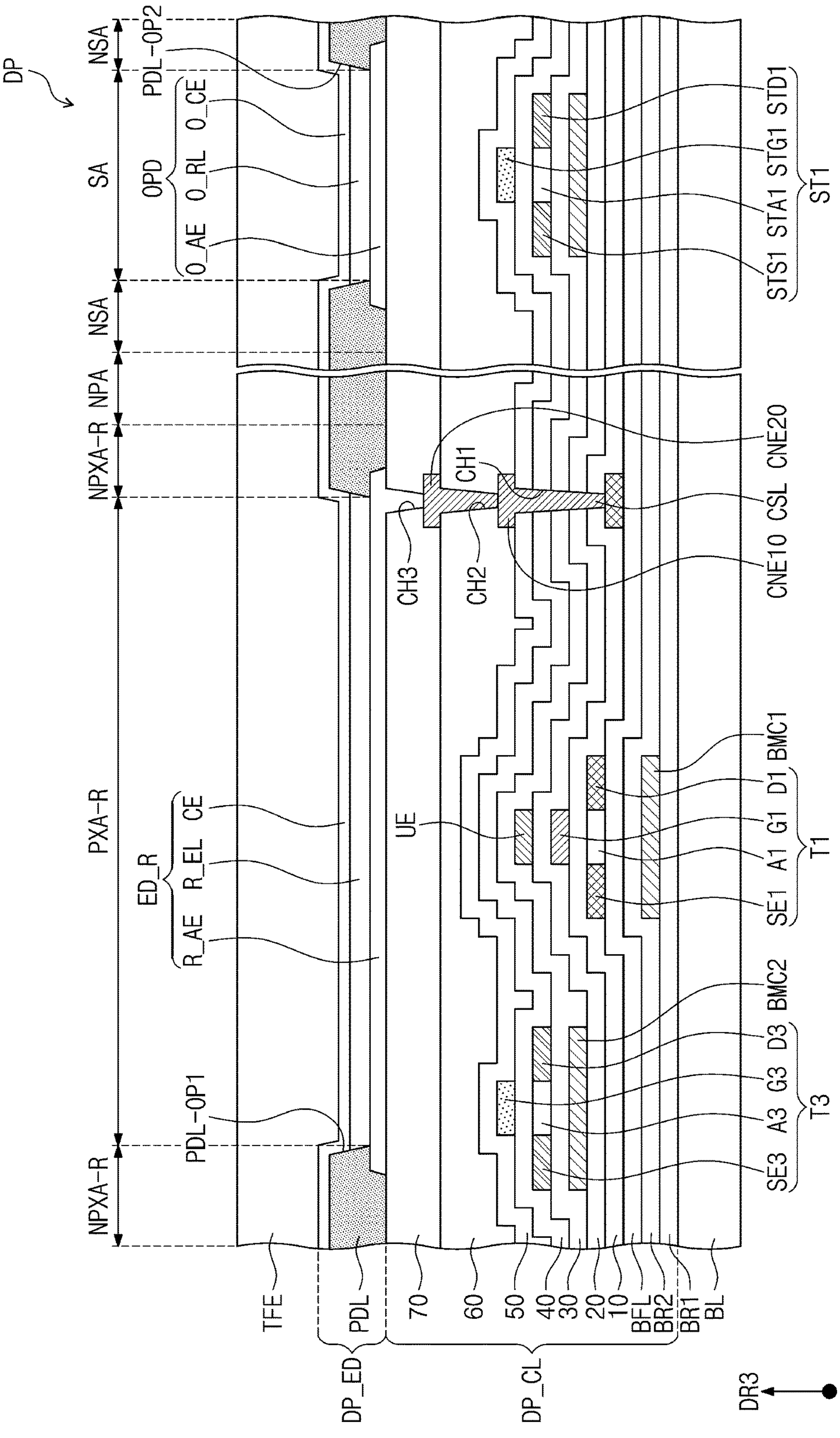
FIG. 8 is a cross-sectional view of a display panel according to an embodiment of the present disclosure.

FIG. 8 is a cross-sectional view of the display panel DP according to an embodiment of the present disclosure. The first and third transistors T1 and T3 and the reset transistor ST1 of FIG. 5 are partially illustrated in FIG. 8.

Referring to FIG. 8, the display panel DP may include the base layer BL, the circuit layer DP_CL disposed on the base layer BL, the element layer DP_ED, and the encapsulation layer TFE.

The base layer BL may include a synthetic resin layer. The synthetic resin layer may include a thermosetting resin material. In an embodiment, the synthetic resin layer is a polyimide-based resin layer, but is not limited thereto. The synthetic resin layer may include at least one of acrylic resin, methacrylic resin, polyisoprene, vinyl resin, epoxy resin, urethane resin, cellulose resin, siloxane resin, polyamide resin, and perylene resin. In addition, the base layer BL may include a glass substrate, a metal substrate, an organic/inorganic composite substrate, etc.

At least one inorganic layer may be formed on an upper surface of the base layer BL. The inorganic layer may include at least one of aluminum oxide, titanium oxide, silicon oxide, silicon oxynitride, zirconium oxide, and hafnium oxide. The inorganic layer may be formed of multiple layers. The multiple inorganic layers may constitute barrier layers BR1 and BR2 and/or a buffer layer BFL, which will be described below. The barrier layers BR1 and BR2 and the buffer layer BFL may be disposed selectively.

The barrier layers BR1 and BR2 prevents foreign objects from being introduced from the outside. The barrier layers BR1 and BR2 may include a silicon oxide layer and a silicon nitride layer. Each of the silicon oxide layer and the silicon nitride layer may be provided in plurality, and the plurality of silicon oxide layers and the plurality of silicon nitride layers may be alternately stacked.

The barrier layers BR1 and BR2 may include a first barrier layer BR1 and a second barrier layer BR2. A first bottom metal layer BMC1 may be interposed between the first barrier layer BR1 and the second barrier layer BR2. In an embodiment of the present disclosure, the first bottom metal layer BMC1 may be omitted.

The buffer layer BFL may be disposed on the barrier layers BR1 and BR2. The buffer layer BFL may increase a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

A first semiconductor pattern may be disposed on the buffer layer BFL. The first semiconductor pattern may include a silicon semiconductor. For example, the silicon semiconductor may include amorphous silicon or polycrystalline silicon. For example, the first semiconductor pattern may include low-temperature polysilicon.

FIG. 8 shows only a portion of the first semiconductor pattern disposed on the buffer layer BFL, and the first semiconductor pattern may be further disposed in any other area. The first semiconductor patterns may be arranged across the pixels in compliance with a specific rule. An electrical property of the first semiconductor pattern may vary depending on whether it is doped. The first semiconductor pattern may include a first area whose conductivity is high and a second area whose conductivity is low. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped at a concentration lower than the concentration of the first area.

The conductivity of the first area may be higher than the conductivity of the second area, and the first area may substantially serve as an electrode or a signal line. The second area may substantially correspond to an active area (or channel) of a transistor. In other words, a portion of the first semiconductor pattern may be an active area of a transistor, another portion of the first semiconductor pattern may be a source area or a drain area of the transistor, and the other portion of the first semiconductor pattern may be a connection electrode or a connection signal line.

A first electrode SE1, a channel part A1, and a second electrode D1 of the first transistor T1 are formed from the first semiconductor pattern. The first electrode SE1 and the second electrode D1 of the first transistor T1 extend from the channel part A1 in opposite directions.

A portion of a connection signal line CSL formed from the first semiconductor pattern is illustrated in FIG. 8. The connection signal line CSL may be electrically connected to the second electrode of the sixth transistor T6 (refer to FIG. 6) in a plan view.

A first insulating layer 10 may be disposed on the buffer layer BFL. The first insulating layer 10 may overlap a plurality of pixels in common and may cover the first semiconductor pattern. The first insulating layer 10 may be an inorganic layer and/or an organic layer and may have a single-layer or multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single silicon oxide layer. In addition to the first insulating layer 10, an insulating layer of the circuit layer DP_CL to be described below may be an inorganic layer and/or an organic layer and may have a single-layer structure or a multi-layer structure. The inorganic layer may include at least one of the above materials, but the present disclosure is not limited thereto.

A gate electrode G1 of the first transistor T1 is disposed on the first insulating layer 10. The gate electrode G1 may be a part of a metal pattern. The gate electrode G1 of the first transistor T1 overlaps the channel part A1 of the first transistor T1. The third electrode G1 of the first transistor T1 may serve as a mask in the process of doping the first semiconductor pattern. The gate electrode G1 may include titanium (Ti), silver (Ag), an alloy containing silver (Ag), molybdenum (Mo), an alloy containing molybdenum, aluminum (Al), an alloy containing aluminum, aluminum nitride (AlN), tungsten (W), tungsten nitride (WN), copper (Cu), indium tin oxide (ITO), indium zinc oxide (IZO), etc., but the present disclosure is not limited thereto.

A second insulating layer 20 may be disposed on the first insulating layer 10 and may cover the gate electrode G1 of the first transistor T1. The second insulating layer 20 may be an inorganic layer and/or an organic layer and may have a single-layer or multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

An upper electrode UE and a second bottom metal layer BMC2 may be disposed on the second insulating layer 20. The upper electrode UE may overlap the gate electrode G1. The upper electrode UE may be a part of a metal pattern. A portion of the gate electrode G1 and the upper electrode UE overlapping the portion of the gate electrode G1 may define the capacitor Cst (refer to FIG. 5). According to an embodiment of the present disclosure, the second insulating layer 20 may be replaced with an insulating pattern. In this case, the upper electrode UE may be disposed on the insulating pattern, and the upper electrode UE may serve as a mask forming the insulating pattern from the second insulating layer 20.

The second bottom metal layer BMC2 may be disposed to correspond to a lower portion of an oxide thin film transistor, for example, the third transistor T3. The second bottom metal layer BMC2 may be supplied with a constant voltage or a signal.

A third insulating layer 30 may be disposed on the second insulating layer 20 and may cover the upper electrode UE and the second bottom metal layer BMC2. The third insulating layer 30 may have a single-layer or multi-layer structure. For example, the third insulating layer 30 may have a multi-layer structure including a silicon oxide layer and a silicon nitride layer.

The second semiconductor pattern may be disposed on the third insulating layer 30. The second semiconductor pattern may include an oxide semiconductor. The oxide semiconductor may include a plurality of areas that are distinguished from each other depending on whether the metal oxide is reduced. An area (hereinafter referred to as a "reduction area") in which the metal oxide is reduced has higher conductivity than an area (hereinafter referred to as a "non-reduction area") in which the metal oxide is not reduced. The reduction area may substantially serve as a source/drain of a transistor or a signal line. The non-reduction area actually corresponds to an active area (alternatively, a semiconductor area or a channel) of a transistor. In other words, a portion of the semiconductor pattern may be an active area of a transistor, another portion thereof may be a source area or a drain area of the transistor, and the other portion may be a connection electrode or a connection signal line.

A first electrode SE3, a channel part A3, and a second electrode D3 of the third transistor T3 are formed from the second semiconductor pattern. The first electrode SE3 and the second electrode D3 include a metal reduced from a metal oxide semiconductor. The first electrode SE3 and the second electrode D3 may extend from the channel part A3 in opposite directions, when viewed in a cross-sectional view.

A fourth insulating layer 40 may be disposed on the third insulating layer 30. The fourth insulating layer 40 may overlap the plurality of pixels in common and may cover the second semiconductor pattern. The fourth insulating layer 40 may include at least one of aluminum oxide, titanium oxide, silicon oxide, silicon nitride, silicon oxynitride, zirconium oxide, and a hafnium oxide.

A gate electrode G3 of the third transistor T3 is disposed on the fourth insulating layer 40. The gate electrode G3 may be a part of a metal pattern. The gate electrode G3 of the third transistor T3 overlaps the channel part A3 of the third transistor T3. The gate electrode G3 may serve as a mask in the process of doping the second semiconductor pattern. According to an embodiment of the present disclosure, the fourth insulating layer 40 may be replaced with an insulating pattern.

A fifth insulating layer 50 may be disposed on the fourth insulating layer 40 and may cover the gate electrode G3. The fifth insulating layer 50 may be an inorganic layer.

A first connection electrode CNE10 may be disposed on the fifth insulating layer 50. The first connection electrode CNE10 may be connected to the connection signal line CSL through a first contact hole CHI penetrating the first to fifth insulating layers 10, 20, 30, 40, and 50.

A sixth insulating layer 60 may be disposed on the fifth insulating layer 50. The sixth insulating layer 60 may be an organic layer. The organic layer may include general purpose polymers such as benzocyclobutene (BCB), polyimide, hexamethyldisiloxane (HMDSO), polymethylmethacrylate (PMMA), or polystyrene (PS); a polymer derivative having a phenolic group; an acrylic polymer; an imide-based polymer; an arylether-based polymer; an amide-based polymer; a fluorine-based polymer; a p-xylene-based polymer; a vinyl alcohol-based polymer; or the blend thereof.

A second connection electrode CNE20 may be disposed on the sixth insulating layer 60. The second connection electrode CNE20 may be connected to the first connection electrode CNE10 through a second contact hole CH2 penetrating the sixth insulating layer 60. A seventh insulating layer 70 may be disposed on the sixth insulating layer 60 and may cover the second connection electrode CNE20. The seventh insulating layer 70 may be an organic layer.

A first electrode layer is disposed on the circuit layer DP_CL. A pixel defining layer PDL is formed on the first electrode layer. The first electrode layer may include a first anode R_AE and the light sensing anode O_AE. In an embodiment, the first anode R_AE and the light sensing anode O_AE are disposed on the seventh insulating layer 70. The first anode R_AE may be connected to the second connection electrode CNE20 through a third contact hole CH3 penetrating the seventh insulating layer 70. Only the first anode R_AE corresponding to the red light is illustrated in FIG. 8, but the first electrode layer may further include a second anode corresponding to the green light and a third anode corresponding to the blue light.

First and second film openings PDL-OP1 and PDL-OP2 may be provided in the pixel defining layer PDL. The first film opening PDL-OP1 exposes at least a portion of the first anode R_AE. The second film opening PDL-OP2 exposes at least a portion of the light sensing anode O_AE.

In an embodiment of the present disclosure, the pixel defining layer PDL may further include a black material. The pixel defining layer PDL may further include a black organic dye or pigment such as carbon black or aniline black. The pixel defining layer PDL may be formed by mixing a blue organic material and a black organic material. The pixel defining layer PDL may further include a liquid-repellent organic material.

As illustrated in FIG. 8, the display panel DP may include an emission area PXA-R and a non-emission area NPXA-R adjacent to the emission area PXA-R. The non-emission area NPXA-R may surround the emission area PXA-R. In an embodiment, the emission area PXA-R is defined to correspond to a partial area of the first anode R_AE, which is exposed by the first film opening PDL-OP1.

An emission layer may be disposed on the first electrode layer. The emission layer may include red, green, and blue emission layers. The red, green, and blue emission layers may be respectively disposed in corresponding areas of the first film openings PDL-OP1. The red, green, and blue emission layers may be independently formed in the red, green, and blue pixels PXR, PXG, and PXB illustrated in FIG. 4. Each of the red, green, and blue emission layers may include an organic material and/or an inorganic material. The red, green, and blue emission layers may generate corresponding color lights. For example, an emission layer R_EL may generate the red light. An example in which the emission layer R_EL is disposed in an area corresponding to the first film openings PDL-OP1 is illustrated in FIG. 8.

In an embodiment, patterned red, green, and blue emission layers are described as an example, but one emission layer may be disposed in a plurality of emission areas in common. In this case, the emission layer may generate a white light or a blue light. Also, the emission layer may have a multi-layer structure that is referred to as "tandem".

The emission layer R_EL may include a low molecular weight organic material or a high molecular weight organic material as a light emitting material. A cathode CE is disposed on the emission layer R_EL. As an example of the present disclosure, the cathode CE may be disposed in the emission area PXA-R, the non-emission area NPXA-R, and a non-pixel area NPA in common.

The circuit layer DP_CL may further include the sensor driving circuit SDC (refer to FIG. 7). For convenience of description, the reset transistor ST1 included in the sensor driving circuit SDC is illustrated. A first electrode STS1, a channel part STA1, and a second electrode STD1 of the reset transistor ST1 are formed from the second semiconductor pattern. In an embodiment, the first electrode STS1 and the second electrode STD1 include a metal reduced from a metal oxide semiconductor. The fourth insulating layer 40 is disposed to cover the first electrode STS1, the channel part STA1, and the second electrode STD1 of the reset transistor ST1. A gate electrode STG1 of the reset transistor ST1 is disposed on the fourth insulating layer 40. In an embodiment, the gate electrode STG1 may be a part of a metal pattern. The gate electrode STG1 of the reset transistor ST1 overlaps the channel part STA1 of the reset transistor ST1.

In an embodiment of the present disclosure, the reset transistor ST1 is be disposed on the same layer as the third transistor T3. That is, the first electrode STS1, the channel part STA1, and the second electrode STD1 of the reset transistor ST1 may be formed through the same process as the first electrode SE3, the channel part A3, and the second electrode D3 of the third transistor T3. The gate electrode STG1 of the reset transistor ST1 may be simultaneously formed through the same process as the gate electrode G3 of the third transistor T3. Although not illustrated separately, the first electrode and the second electrode of each of the amplification transistor ST2 and the output transistor ST3 of the sensor driving circuit SDC may be formed through the same process as the first electrode SE1 and the second electrode D1 of the first transistor T1. The reset transistor ST1 and the third transistor T3 may be formed on the same layer through the same process. Accordingly, because an additional process for forming the reset transistor ST1 is not required, the efficiency of process may be increased, and manufacturing costs may be reduced.

The connection transistors CT11 to CT1x illustrated in FIG. 3 may also be disposed on the same layer as the reset transistor ST1.

The element layer DP_ED may further include the light sensing element OPD (refer to FIG. 5). Only the light sensing element OPD is illustrated in FIG. 8.

The light sensing element OPD may include the light sensing anode O_AE, a photoelectric conversion layer O_RL, and a photoelectric cathode O_CE. The light sensing anode O_AE may be disposed on the same layer as the first electrode layer. That is, the light sensing anode O_AE may be disposed on the circuit layer DP_CL and may be simultaneously formed through the same process as the first anode R_AE.

The second film opening PDL-OP2 of the pixel defining layer PDL exposes at least a portion of the light sensing anode O_AE. The photoelectric conversion layer O_RL is disposed on the portion of the light sensing anode O_AE, which is exposed by the second film opening PDL-OP2. The photoelectric conversion layer O_RL may include an organic photo-sensing material. The photoelectric cathode O_CE may be disposed on the photoelectric conversion layer O_RL. The photoelectric cathode O_CE may be simultaneously formed through the same process as the cathode CE. In an example embodiment of the present disclosure, the photoelectric cathode O_CE is integrally formed with the cathode CE. For example, a single layer may be used to form the photoelectric cathode O_CE and the cathode CE.

Each of the light sensing anode O_AE and the photoelectric cathode O_CE may receive an electrical signal. The photoelectric cathode O_CE and the light sensing anode O_AE may receive different signals. Accordingly, a given electric field may be formed between the light sensing anode O_AE and the photoelectric cathode O_CE. The photoelectric conversion layer O_RL generates an electrical signal corresponding to the light incident onto a sensor. The photoelectric conversion layer O_RL may generate charges by absorbing the energy of the incident light. For example, the photoelectric conversion layer O_RL may include a light-sensitive semiconductor material.

The charges generated by the photoelectric conversion layer O_RL changes the electric field between the light sensing anode O_AE and the photoelectric cathode O_CE. The amount of charges generated by the photoelectric conversion layer O_RL may vary depending on whether a light is incident onto the light sensing element OPD, the amount of light incident onto the light sensing element OPD, and the intensity of light incident onto the light sensing element OPD. As such, the electric field formed between the light sensing anode O_AE and the photoelectric cathode O_CE may vary. The light sensing element OPD according to the present disclosure may obtain one of pieces of information about the fingerprint, blood pressure, and touch of the user through the change in the electric field between the light sensing anode O_AE and the photoelectric cathode O_CE.

However, this is merely provided as an example. For example, the light sensing element OPD may also include a photo transistor in which the photoelectric conversion layer O_RL is used as an active layer. In this case, the light sensing element OPD may obtain fingerprint information by sensing the amount of current flowing through the photo transistor. The light sensing element OPD according to an embodiment of the present disclosure may include various photoelectric conversion elements each capable of generating an electrical signal in response to the change in the amount of light, but the present disclosure is not limited to a particular embodiment.

The encapsulation layer TFE is disposed on the element layer DP_ED. The encapsulation layer TFE includes at least one inorganic layer or at least one organic layer. According to an embodiment of the present disclosure, the encapsulation layer TFE may include two inorganic layers and an organic layer interposed therebetween. According to an embodiment of the present disclosure, a thin-film encapsulation layer may include a plurality of inorganic layers and a plurality of organic layers, which are alternately stacked.

The inorganic layer of the encapsulation layer TFE protects the light emitting element ED_R and the light sensing element OPD from moisture/oxygen, and the organic layer of the encapsulation layer TFE protects the light emitting element ED_R and the light sensing element OPD from foreign substances such as dust particles. The encapsulation inorganic layer may include a silicon nitride layer, a silicon oxynitride layer, a silicon oxide layer, a titanium oxide layer, an aluminum oxide layer, etc., but the present disclosure is not particularly limited thereto. The encapsulation organic layer may include an acryl-based organic layer, and the present disclosure is not limited thereto.

Figure 9:
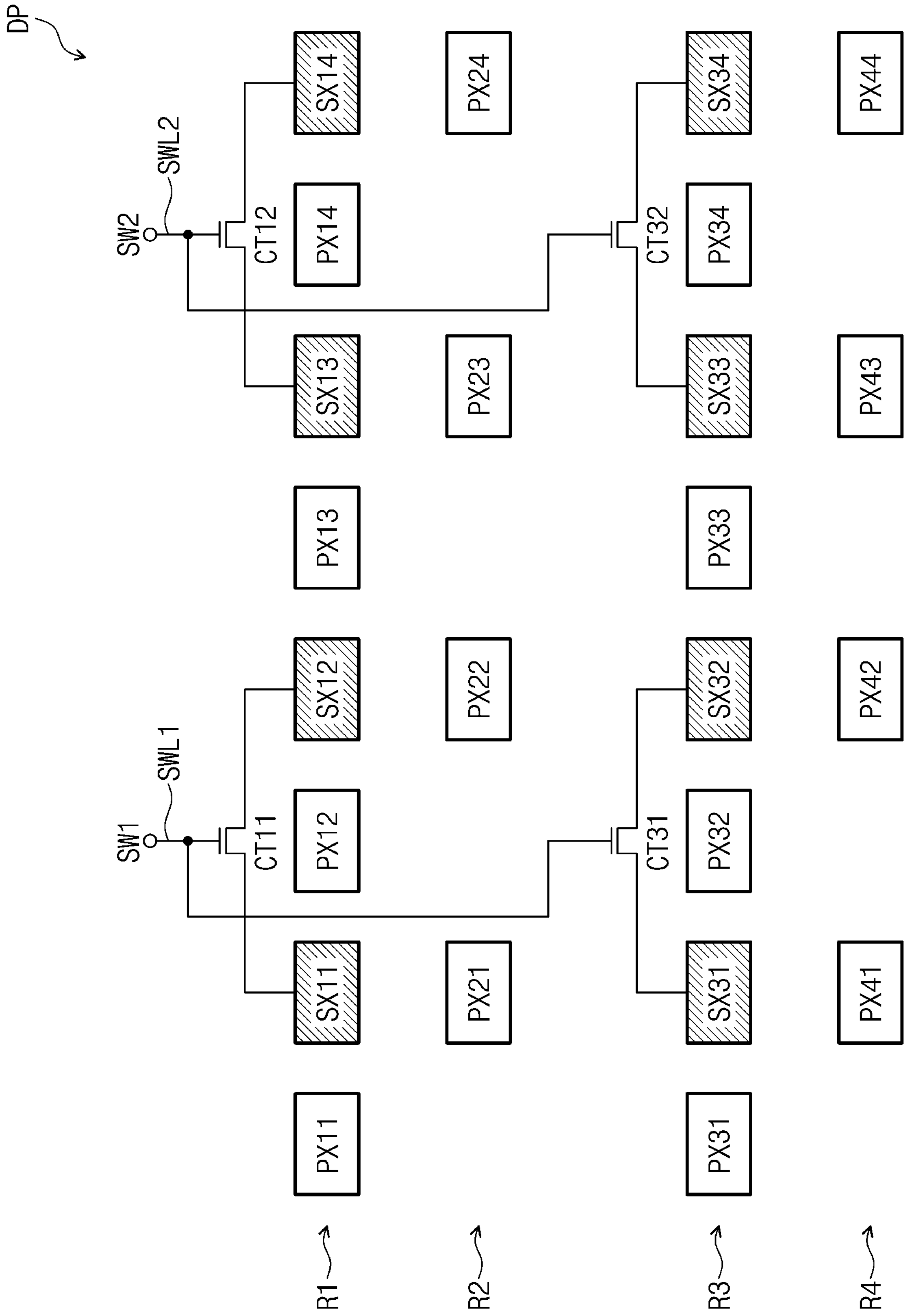
FIG. 9 is a diagram illustrating pixels and sensors disposed in a display panel.

FIG. 9 is a diagram illustrating the pixels PX11 to PX44 and the sensors SX11 to SX34 disposed in the display panel DP according to an embodiment. Some of the pixels PX and the sensors SX of the display panel DP illustrated in FIG. 3 are illustrated in FIG. 9.

Referring to FIG. 9, the pixels PX11, PX12, PX13, and PX14 and the sensors SX11, SX12, SX13, and SX14 are disposed in a first row R1 of the display panel DP. The pixels PX21, PX22, PX23, and PX24 are disposed in a second row R2 of the display panel DP. The pixels PX31, PX32, PX33, and PX34 and the sensors SX31, SX32, SX33, and SX34 are disposed in a third row R3 of the display panel DP. The pixels PX41, PX42, PX43, and PX44 are disposed in a fourth row R4 of the display panel DP.

The placement of the pixels PX11 to PX44 and the sensors SX11 to SX34 illustrated in FIG. 9 is provided merely as an example, and the present disclosure is not limited thereto.

In an embodiment, the display panel DP further includes the connection transistors CT11, CT12, CT31, and CT32.

The connection transistor CT11 may electrically connect the sensors SX11 and SX12 in response to a switching signal SW1 received through the switching line SWL1. For example, the switching signal SW1 may be applied by a control circuit (e.g., 100) to a gate of the connection transistor CT11.

The connection transistor CT12 may electrically connect the sensors SX13 and SX14 in response to a switching signal SW2 received through the switching line SWL2. For example, the switching signal SW2 may be applied by the control circuit to a gate of the connection transistor CT12.

The connection transistor CT31 may electrically connect the sensors SX31 and SX32 in response to the switching signal SW1 received through the switching line SWL1. For example, the switching signal SW1 may be applied by the control circuit to a gate of the connection transistor CT31.

The connection transistor CT32 may electrically connect the sensors SX33 and SX34 in response to the switching signal SW2 received through the switching line SWL2. For example, the switching signal SW2 may be applied by the control circuit to a gate of the connection transistor CT32.

An example in which the connection transistors CT31 and CT32 operate in response to the switching signals SW1 and SW2, respectively, is illustrated in FIG. 9, but embodiments of the present disclosure are not limited thereto. In an embodiment, the connection transistors CT31 and CT32 operate in response to signals different from the switching signals SW1 and SW2.

Figure 10:
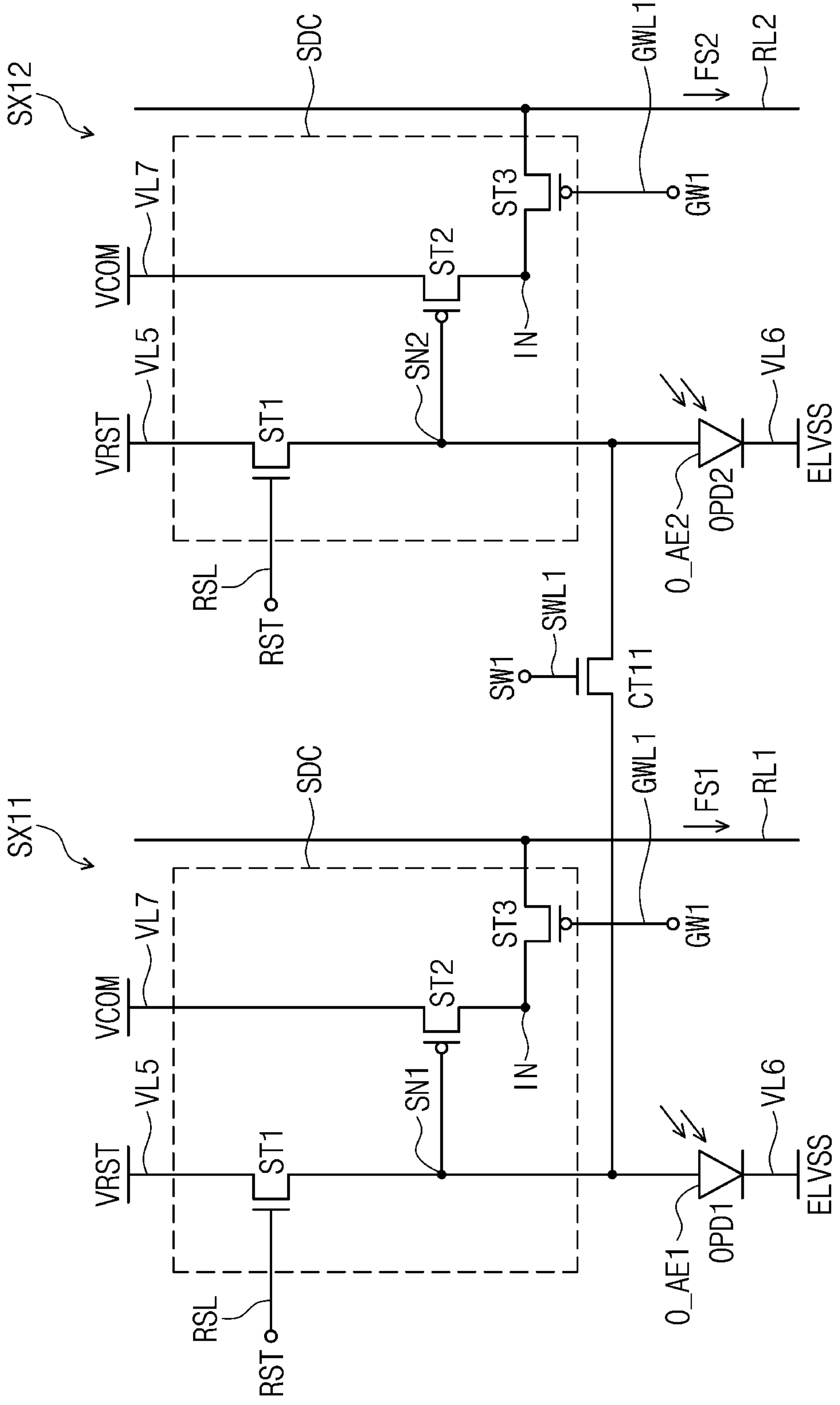
FIG. 10 is a diagram illustrating a connection relationship between a first sensor, a second sensor, and a connection transistor

FIG. 10 is a diagram illustrating a connection relationship between the first sensor SX11, the second sensor SX12, and the connection transistor CT11 according to an embodiment.

Referring to FIG. 10, each of the first sensor SX11 and the second sensor SX12 may include the same circuit configuration as the sensor SX illustrated in FIG. 3. For convenience of description, reference signs of some of the components of the first sensor SX11 and the second sensor SX12 are marked to be the same as those of the sensor SX illustrated in FIG. 3, and thus, additional description will be omitted to avoid redundancy.

The connection transistor CT11 is connected between a light sensing anode O_AE1 of a first light sensing element OPD1 in the first sensor SX11 and a light sensing anode O_AE2 of a second light sensing element OPD2 in the second sensor SX12. That is, the connection transistor CT11 is connected between a first sensing node SN1 in the first sensor SX11 and a second sensing node SN2 in the second sensor SX12. A gate electrode of the connection transistor CT11 is connected to the switching line SWL1. The connection transistor CT11 may connected between gates of the amplification transistors ST2 of the sensors SX11 and SX12.

In an embodiment, the connection transistor CT11 may be the same N-type transistor as the reset transistor ST1 of each of the first sensor SX11 and the second sensor SX12. However, the present disclosure is not limited thereto.

When the switching signal SW1 transferred through the switching line SWL1 is at the active level (e.g., the high level), the connection transistor CT11 may electrically connect the first sensing node SN1 in the first sensor SX11 and the second sensing node SN2 in the second sensor SX12. Similarly, the first sensing node SN1 may be disconnected from the second sensing node SN2 when the switching signal SW1 transferred through the switching line SWL1 is at an inactive or deactivated level.

Referring to FIGS. 3 and 10, the readout circuit 600 may receive a first sensing signal FS1 from the first sensor SX11 and may receive a second sensing signal FS2 from the second sensor SX12. The readout circuit 600 provides the readout signal RS corresponding to the first and second sensing signals FS1 and FS2 to the driving controller 100.

In an embodiment, when the amount of external light or the amount of light output from the pixels PX (refer to FIG. 3) is small (i.e., when illuminance is low) or less than a threshold amount, the signal to noise ratio of the first and second sensing signals FS1 and FS2 received from the first and second sensors SX11 and SX12 may be small, or the first and second sensing signals FS1 and FS2 may be weak. In this case, it is difficult for the readout circuit 600 to perform a normal sensing operation based on the first and second sensing signals FS1 and FS2. The readout circuit 600 may provide the driving controller 100 with the readout signal RS indicating that the normal sensing operation is impossible. For example, when the normal sensing operation is impossible, the readout circuit 600 may provide the driving controller 100 with the readout signal RS having a preset specific value. For example, the system may conclude that the normal sensing operation is impossible when the amount of external light or the amount of light output from one or more of the pixels PX is less than a threshold amount.

When the readout signal RS has the specific value, the driving controller 100 provides the scan control signal SCS to the scan and sensor driver 300 such that the switching signal SW1 is set to the active level (e.g., the high level).

The scan and sensor driver 300 outputs the switching signal SW1 of the high level to the switching line SWL1 in response to the scan control signal SCS.

When the switching signal SW1 is at the high level, the connection transistor CT11 may be turned on, and thus, the light sensing anode O_AE1 of the light sensing element OPD1 in the first sensor SX11 and the light sensing anode O_AE2 of the light sensing element OPD2 in the second sensor SX12 may be electrically connected.

Figure 11:
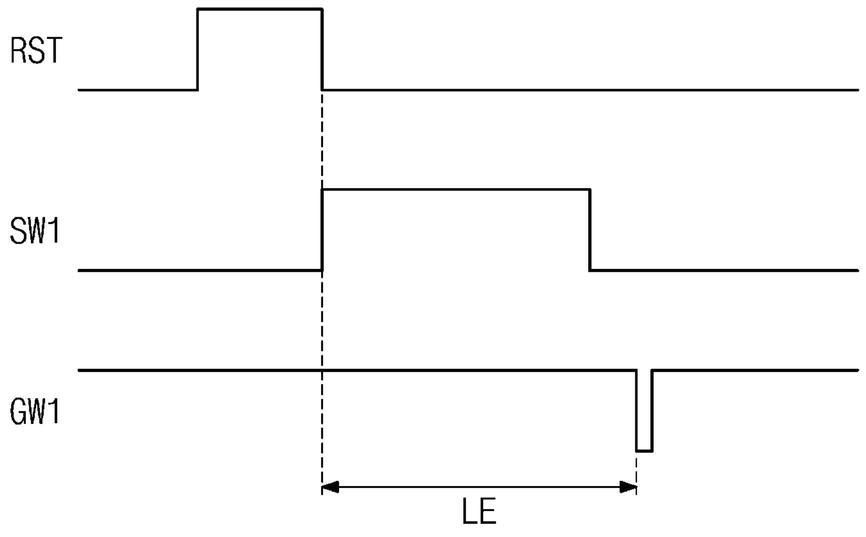
FIG. 11 is a timing diagram for describing an operation of sensors illustrated in FIG. 10.

FIG. 11 is a timing diagram for describing an operation of the sensors SX11 and SX12 illustrated in FIG. 10.

Referring to FIGS. 10 and 11, when the reset signal RST transitions to the high level, the reset transistor ST1 of each of the first and second sensors SX11 and SX12 is turned on. When the reset transistor ST1 of the first sensor SX11 is turned on, the first sensing node SN1 may be initialized with the reset voltage VRST. When the reset transistor ST2 of the second sensor SX12 is turned on, the second sensing node SN2 may be initialized with the reset voltage VRST.

In an embodiment, after the first sensing node SN1 and the second sensing node SN2 are initialized with the reset voltage VRST, when the switching signal SW1 transitions to the high level, the connection transistor CT11 is turned on. Thus, the first sensing node SN1 of the first sensor SX11 and the second sensing node SN2 of the second sensor SX12 may be electrically connected.

The first and second sensors SX11 and SX12 are exposed to the light during the light exposure period LE. When the user's hand touches a display surface, the first and second light sensing elements OPD1 and OPD2 may generate photoelectrons corresponding to the light reflected by the user's hand, and the generated photoelectrons may be accumulated at the first and second sensing nodes SN1 and SN2.

In this case, because the light sensing anode O_AEl of the light sensing element OPD1 in the first sensor SX11 and the light sensing anode O_AE2 of the light sensing element OPD2 in the second sensor SX12 are electrically connected by the connection transistor CT11 having the turn-on state, the amount of current flowing through the first and second light sensing elements OPD1 and OPD2 may increase.

The amplification transistor ST2 of the first sensor SX11 generates the source-drain current in proportion to the amount of photoelectrons (or charges) of the first sensing node SN1, which are input to the gate electrode of the amplification transistor ST2. The amplification transistor ST2 of the second sensor SX12 generates the source-drain current in proportion to the amount of photoelectrons (or charges) of the second sensing node SN2, which are input to the gate electrode of the amplification transistor ST2.

When the scan signal GW1 transitions to the active level, that is, the low level, the output transistor ST3 of each of the first and second sensors SX1 and SX2 is turned on.

When the output transistor ST3 of the first sensor SX11 is turned on, the first sensing signal FS1 corresponding to the current flowing through the amplification transistor ST2 may be output to the first readout line RL1.

When the output transistor ST3 of the second sensor SX12 is turned on, the second sensing signal FS2 corresponding to the current flowing through the amplification transistor ST2 may be output to the second readout line RL2.

That is, the first and second sensing signals FS1 and FS2 corresponding to the amount of light sensed by the first and second light sensing elements OPD1 and OPD2 of the first and second sensors SX1 and SX2 may be output to the first and second readout lines RL1 and RL2.

When the amount of current flowing through the first and second light sensing elements OPD1 and OPD2 increases, the characteristic of the signal to noise ratio of the first and second sensing signals FS1 and FS2 provided to the readout circuit 600 may be increased.

Figure 12:
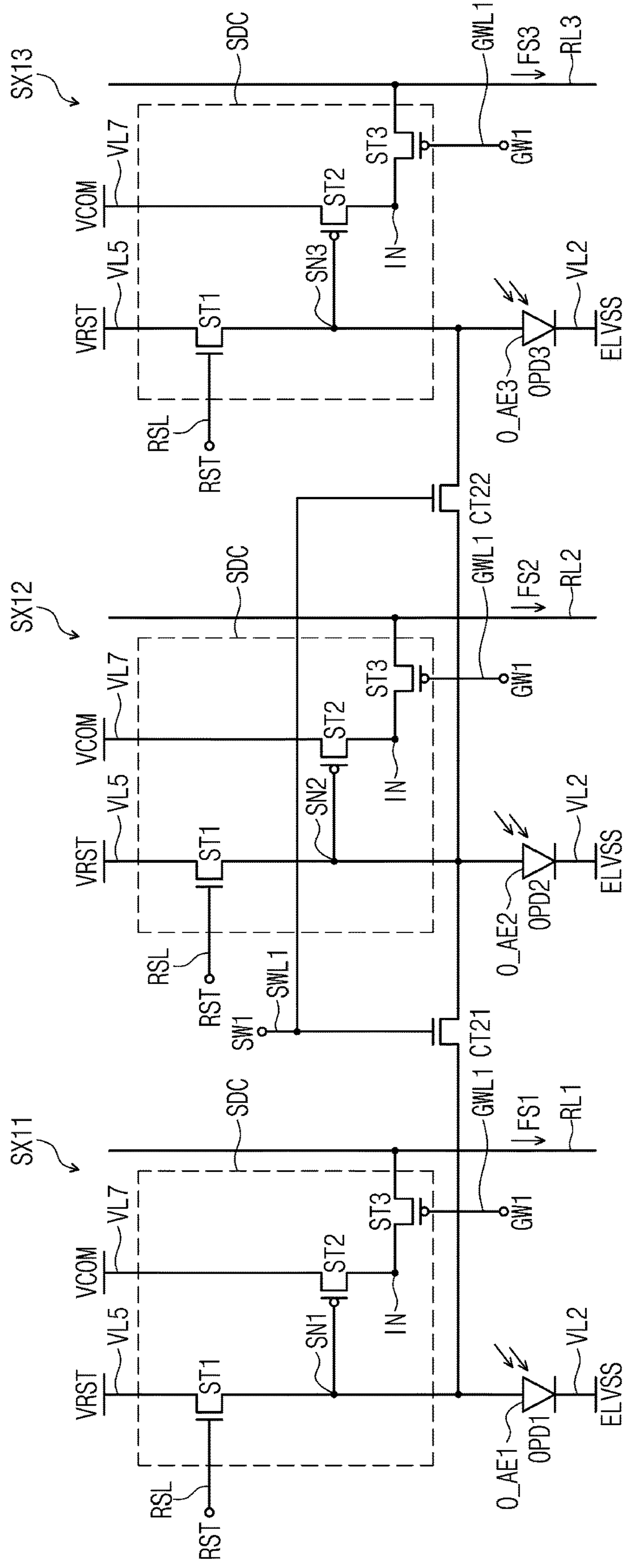
FIG. 12 is a diagram illustrating a connection relationship between a first sensor, a second sensor, a third sensor, a first connection transistor, and a second connection transistor.

FIG. 12 is a diagram illustrating a connection relationship between the first sensor SX11, the second sensor SX12, and the third sensor SX13, the first connection transistor CT21, and the second connection transistor CT22 according to an embodiment.

Referring to FIG. 12, each of the first sensor SX11, the second sensor SX12, and the third sensor SX13 may include the same circuit configuration as the sensor SX illustrated in FIG. 3. For convenience of description, reference signs of some of the components of the first sensor SX11, the second sensor SX12, and the third sensor SX13 are marked to be the same as those of the sensor SX illustrated in FIG. 3, and thus, additional description will be omitted to avoid redundancy.

The first connection transistor CT21 is connected between the light sensing anode O_AE1 of the first light sensing element OPD1 in the first sensor SX11 and the light sensing anode O_AE2 of the second light sensing element OPD2 in the second sensor SX12. That is, the first connection transistor CT21 is connected between the first sensing node SN1 in the first sensor SX11 and the second sensing node SN2 in the second sensor SX12. A gate electrode of the connection transistor CT21 is connected to the switching line SWL1.

The second connection transistor CT22 is connected between the light sensing anode O_AE2 of the second light sensing element OPD2 in the second sensor SX12 and the light sensing anode O_AE3 of the third light sensing element OPD3 in the third sensor SX13. That is, the second connection transistor CT22 is connected between the second sensing node SN2 in the second sensor SX12 and the third sensing node SN3 in the third sensor SX13. A gate electrode of the second connection transistor CT22 is connected to the switching line SWL1.

In an embodiment, the first connection transistor CT21 and the second connection transistor CT22 may be the same N-type transistor as the reset transistor ST1 of each of the first sensor SX11, the second sensor SX12 and the third sensor SX13. However, the present disclosure is not limited thereto.

When the switching signal SW1 transferred through the switching line SWL1 is at the active level (e.g., the high level), the first connection transistor CT21 may electrically connect the first sensing node SN1 in the first sensor SX11 and the second sensing node SN2 in the second sensor SX12. When the switching signal SW1 transferred through the switching line SWL1 is at the active level (e.g., the high level), the second connection transistor CT22 may electrically connect the second sensing node SN2 in the second sensor SX12 and the third sensing node SN3 in the third sensor SX13.

The display device with the above configuration electrically connects at least two sensors when the signal to noise ratio of a sensing signal obtained from a sensor is not good (or is weak). The characteristic of the signal to noise ratio of the sensing signals obtained from the electrically connected sensors may be increased.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a pixel including a light emitting element;

a first sensor including a first light sensing element connected to a first sensing node, the first sensor disposed outside the pixel;

a second sensor including a second light sensing element connected to a second sensing node, the second sensor disposed outside the pixel; and a first connection transistor disposed outside the pixel and the first and second sensors, the first connection transistor configured to electrically connect the first sensing node of the first sensor and the second sensing node of the second sensor in response to a switching signal.

2. The display device of claim 1, wherein the first light sensing element includes a first light sensing anode connected to the first sensing node and a first cathode connected to a driving voltage line, and wherein the second light sensing element includes a second light sensing anode connected to the second sensing node and a second cathode connected to the driving voltage line.

3. The display device of claim 1, wherein the first sensor comprises:

a first transistor connected between a reset voltage line and the first sensing node;

a second transistor connected between a sensor driving voltage line and an intermediate node and including a gate electrode connected to the first sensing node; and a third transistor connected between the intermediate node and a first readout line and including a gate electrode connected to a scan line.

4. The display device of claim 3, wherein the first transistor and the first connection transistor are transistors of a first type, and wherein the second transistor and the third transistor are transistors of a second type different from the first type.

5. The display device of claim 1, wherein the second sensor comprises:

a first transistor connected between a reset voltage line and the second sensing node;

a second transistor connected between a sensor driving voltage line and an intermediate node and including a gate electrode connected to the second sensing node; and a third transistor connected between the intermediate node and a second readout line and including a gate electrode connected to a scan line.

6. The display device of claim 5, wherein the first transistor and the first connection transistor are transistors of a first type, and wherein the second transistor and the third transistor are transistors of a second type different from the first type.

7. The display device of claim 1, further comprising:

a third sensor including a third light sensing element connected to a third sensing node; and a second connection transistor configured to electrically connect the second sensing node of the second sensor and the third sensing node of the third sensor in response to the switching signal.

8. A display device comprising:

a display panel;

a readout circuit configured to receive a first sensing signal and a second sensing signal from the display panel to output a readout signal; and a driving controller configured to enable an image to be displayed in the display panel, wherein the display panel comprises:

a pixel including a light emitting element;

a first sensor including a first light sensing element connected to a first sensing node, and configured to output the first sensing signal, the first sensor disposed outside the pixel;

a second sensor including a second light sensing element connected to a second sensing node, and configured to output the second sensing signal, the second sensor disposed outside the pixel; and a first connection transistor disposed outside the pixels and the first and second sensors, the first connection transistor electrically connecting the first sensing node of the first sensor and the second sensing node of the second sensor, wherein the driving controller turns on the first connection transistor upon determining that a signal to noise ratio of the readout signal is less than a threshold and otherwise turns off the first connection transistor.

9. The display device of claim 8, wherein the first light sensing element includes a first light sensing anode connected to the first sensing node and a first cathode connected to a driving voltage line, and wherein the second light sensing element includes a second light sensing anode connected to the second sensing node and a second cathode connected to the driving voltage line.

10. The display device of claim 8, wherein the first sensor comprises: a first transistor connected between a reset voltage line and the first sensing node; a second transistor connected between a sensor driving voltage line and an intermediate node and including a gate electrode connected to the first sensing node; and a third transistor connected between the intermediate node and a first readout line and including a gate electrode connected to a scan line, and wherein the first readout line outputs the first sensing signal.

11. The display device of claim 10, wherein the first transistor and the first connection transistor are transistors of a first type, and wherein the second transistor and the third transistor are transistors of a second type different from the first type.

12. The display device of claim 8, wherein the second sensor comprises: a first transistor connected between a reset voltage line and the second sensing node; a second transistor connected between a sensor driving voltage line and an intermediate node and including a gate electrode connected to the second sensing node; and a third transistor connected between the intermediate node and a second readout line and including a gate electrode connected to a scan line, and wherein the second readout line outputs the second sensing signal.

13. The display device of claim 12, wherein the first transistor and the first connection transistor are transistors of a first type, and wherein the second transistor and the third transistor are transistors of a second type different from the first type.

14. The display device of claim 8, wherein the display panel further comprises:

a third sensor including a third light sensing element connected to a third sensing node, and configured to output a third sensing signal; and a second connection transistor electrically connecting the second sensing node of the second sensor and the third sensing node of the third sensor, wherein the driving controller turns on the second connection transistor upon determining that the signal to noise ratio of the readout signal is less than the threshold and otherwise turns off the second connection transistor.

15. An electronic device comprising:

a driving controller configured to generate a switching signal; and a display device comprising:

a pixel including a light emitting element;

a first sensor including a first light sensing element connected to a first sensing node, the first sensor disposed outside the pixel;

a second sensor including a second light sensing element connected to a second sensing node, the second sensor disposed outside the pixel; and a first connection transistor disposed outside the pixel and the first and second sensors, the first connection transistor configured to electrically connect the first sensing node of the first sensor and the second sensing node of the second sensor in response to the switching signal.

* * * * *